United States Patent
Miller et al.

(10) Patent No.: US 10,537,850 B2
(45) Date of Patent: *Jan. 21, 2020

(54) REMOVAL OF ATMOSPHERIC POLLUTANTS FROM GAS, RELATED APPARATUS, PROCESSES AND USES THEREOF

(71) Applicant: Intelligent Abatement, LLC, Los Angeles, CA (US)

(72) Inventors: Roger Glenn Miller, Fullerton, CA (US); Larry Kent Barnthouse, Santa Ana, CA (US); Robert George Richardson, Shingletown, CA (US)

(73) Assignee: Intelligent Abatement, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/961,774

(22) Filed: Apr. 24, 2018

(65) Prior Publication Data

US 2018/0369748 A1    Dec. 27, 2018

Related U.S. Application Data

(63) Continuation of application No. 15/005,953, filed on Jan. 25, 2016, now Pat. No. 9,950,295, which is a
(Continued)

(51) Int. Cl.
*B01D 53/56* (2006.01)
*B01D 53/50* (2006.01)
(Continued)

(52) U.S. Cl.
CPC ............ *B01D 53/56* (2013.01); *B01D 53/50* (2013.01); *B01D 53/60* (2013.01); *B01D 53/76* (2013.01);
(Continued)

(58) Field of Classification Search
None
See application file for complete search history.

(56) References Cited

U.S. PATENT DOCUMENTS

| 3,023,076 A | 2/1962 | Karwat |
| 3,482,825 A | 12/1969 | Bjerkan |

(Continued)

FOREIGN PATENT DOCUMENTS

| EP | 1845425 A1 | 10/2007 |
| EP | 2498148 A1 | 9/2012 |
| WO | 2013180760 A2 | 12/2013 |

OTHER PUBLICATIONS

Albright, "Industrial Mixing Technology," Chapter 9. Static Line Mixers. Albright's Chemical Engineering Handbook. Boca Raton: CRC Press. Ipswich, MA, pp. 682-685 (2009).
(Continued)

*Primary Examiner* — Timothy C Vanoy
(74) *Attorney, Agent, or Firm* — Snell & Wilmer L.L.P.

(57) ABSTRACT

Methods related generally to the removal of atmospheric pollutants from the gas phase, are provided, as well as related apparatus, processes and uses thereof. A single-stage air scrubbing apparatus is provided that includes at least one reaction vessel, at least one introduction duct, and a turbulence component, wherein a residence time is sufficient to allow the conversion of at least one atmospheric pollution compound to at least one other compound, molecule or atom. In some embodiments, the at least one atmospheric pollution compound comprises nitrogen oxide, sulfur oxide or a combination thereof. Additionally, methods of removing atmospheric pollution compounds from a waste gas stream are disclosed that include introducing a waste gas stream and at least one additional gas stream, mist stream, liquid stream or combination thereof into a single-stage air scrubbing
(Continued)

apparatus at a flow rate sufficient to allow for conversion of the at least one atmospheric pollution compound.

18 Claims, 9 Drawing Sheets

Related U.S. Application Data continuation of application No. 14/537,834, filed on Nov. 10, 2014, now Pat. No. 9,272,257, which is a continuation of application No. 14/126,403, filed as application No. PCT/US2013/020586 on Jan. 7, 2013, now Pat. No. 8,883,105.

(60) Provisional application No. 61/584,347, filed on Jan. 9, 2012, provisional application No. 61/656,192, filed on Jun. 6, 2012, provisional application No. 61/715,149, filed on Oct. 17, 2012, provisional application No. 61/715,146, filed on Oct. 17, 2012.

(51) Int. Cl.
| | |
|---|---|
| *B01D 53/60* | (2006.01) |
| *B01D 53/76* | (2006.01) |
| *B01J 19/24* | (2006.01) |
| *B01J 19/18* | (2006.01) |
| *B01J 19/00* | (2006.01) |
| *B01F 5/04* | (2006.01) |
| *B01F 5/06* | (2006.01) |
| *B01F 3/04* | (2006.01) |
| *B01D 53/34* | (2006.01) |

(52) U.S. Cl.
CPC ........ *B01F 3/04049* (2013.01); *B01F 5/0451* (2013.01); *B01F 5/0466* (2013.01); *B01F 5/0618* (2013.01); *B01J 19/006* (2013.01); *B01J 19/1806* (2013.01); *B01J 19/2405* (2013.01); *B01D 53/346* (2013.01); *B01D 2251/108* (2013.01); *B01D 2258/06* (2013.01); *B01D 2259/4508* (2013.01); *B01F 2005/0631* (2013.01); *B01F 2005/0639* (2013.01); *B01J 2219/00779* (2013.01); *Y02A 50/2344* (2018.01)

(56) References Cited

U.S. PATENT DOCUMENTS

| | | | |
|---|---|---|---|
| 3,923,288 A | 12/1975 | King | |
| 3,957,949 A | 5/1976 | Senjo et al. | |
| 3,962,112 A | 6/1976 | Shaheen | |
| 3,965,975 A | 6/1976 | Edmundson | |
| 4,035,470 A | 7/1977 | Senjo et al. | |
| 4,119,702 A | 10/1978 | Azuhata et al. | |
| 5,271,908 A | 12/1993 | Shiban et al. | |
| 5,328,673 A | 7/1994 | Kaczur et al. | |
| 5,529,093 A | 6/1996 | Gallagher et al. | |
| 5,565,180 A | 10/1996 | Spink | |
| 5,639,434 A | 6/1997 | Patrikainen et al. | |
| 5,887,977 A | 3/1999 | Morikawa | |
| 6,187,274 B1 | 2/2001 | Nilsson | |
| 6,241,809 B1 | 6/2001 | Hopkins | |
| 6,623,155 B1 | 9/2003 | Baron | |
| 6,946,021 B2 | 9/2005 | Aoyagi | |
| 7,118,720 B1 | 10/2006 | Mendelsohn et al. | |
| 7,455,820 B2 | 11/2008 | Lee et al. | |
| 7,535,150 B1 | 5/2009 | Wilson | |
| 8,012,438 B2 | 9/2011 | Hutson et al. | |
| 8,425,866 B2 | 4/2013 | Parrish et al. | |
| 8,740,449 B2 | 6/2014 | Kingsford | |
| 8,883,105 B1* | 11/2014 | Miller ................... | B01D 53/60 |
| | | | 423/235 |
| 9,144,769 B2 | 9/2015 | Richardson | |
| 9,149,784 B2 | 10/2015 | Miller et al. | |
| 9,272,257 B2* | 3/2016 | Miller ................... | B01D 53/60 |
| 9,327,235 B2 | 5/2016 | Richardson | |
| 9,757,687 B2 | 9/2017 | Miller et al. | |
| 9,950,295 B2* | 4/2018 | Miller ................... | B01D 53/60 |
| 9,981,241 B2 | 5/2018 | Richardson et al. | |
| 2002/0061270 A1 | 5/2002 | Osborne | |
| 2004/0005262 A1 | 1/2004 | Takacs et al. | |
| 2004/0131523 A1* | 7/2004 | Takacs ................... | B01D 53/14 |
| | | | 423/235 |
| 2004/0237782 A1 | 12/2004 | Decker | |
| 2005/0214187 A1 | 9/2005 | Johnson | |
| 2006/0239878 A1 | 10/2006 | Lee et al. | |
| 2008/0213148 A1 | 9/2008 | Parrish et al. | |
| 2008/0241030 A1 | 10/2008 | Parrish et al. | |
| 2010/0329955 A1 | 12/2010 | Hutson et al. | |
| 2013/0177490 A1 | 7/2013 | Richardson | |
| 2014/0314648 A1 | 10/2014 | Richardson et al. | |
| 2015/0056117 A1 | 2/2015 | Miller et al. | |
| 2015/0064087 A1 | 3/2015 | Miller et al. | |
| 2015/0185599 A1 | 7/2015 | Mullins | |
| 2015/0224443 A1 | 8/2015 | Richardson | |
| 2015/0238896 A1 | 8/2015 | Miller et al. | |
| 2016/0136574 A1 | 5/2016 | Miller et al. | |
| 2016/0296887 A1 | 10/2016 | Richardson | |
| 2016/0346726 A1 | 12/2016 | Richardson | |

OTHER PUBLICATIONS

Dripping Wet Water—What is chlorine dioxide. ClO2IX, Dripping Wet Water Inc. (Year: 2014); total 3 pages.
Non-Final Office Action dated Aug. 22, 2014 in corresponding U.S. Appl. No. 14/126,403, filed Dec. 13, 2013; total 9 pages.
Notice of Allowance dated Oct. 7, 2014 in corresponding U.S. Appl. No. 14/126,403, filed Dec. 13, 2013; total 8 pages.
Notice of Allowance dated Aug. 31, 2015 in corresponding U.S. Appl. No. 14/531,943, filed Nov. 3, 2014; total 15 pages.
Non-Final Office Action dated May 15, 2015 in corresponding U.S. Appl. No. 14/537,834, filed Nov. 10, 2014; total 12 pages.
Notice of Allowance dated Oct. 28, 2015 in corresponding U.S. Appl. No. 14/537,834, filed Nov. 10, 2014; total 13 pages.
Non-Final Office Action dated Aug. 17, 2015 in corresponding U.S. Appl. No. 14/666,199, filed Mar. 23, 2015; total 8 pages.
Non-Final Office Action dated Sep. 16, 2015 in corresponding U.S. Appl. No. 14/666,199, filed Mar. 23, 2015; total 8 pages.
Notice of Allowance dated Jun. 15, 2016 in corresponding U.S. Appl. No. 14/666,199, filed Mar. 23, 2015; total 10 pages.
Non-Final Office Action dated Sep. 14, 2018 in corresponding U.S. Appl. No. 15/702,668, filed Sep. 12, 2017; total 53 pages.
Non-Final Office Action dated Jun. 10, 2019 in corresponding U.S. Appl. No. 15/702,668, filed Sep. 12, 2017; total 24 pages.
Non-Final Office Action dated Jun. 28, 2013 in corresponding U.S. Appl. No. 13/727,512, filed Dec. 26, 2012; total 10 pages.
Non-Final Office Action dated Aug. 29, 2013 in corresponding U.S. Appl. No. 13/727,512, filed Dec. 26, 2012; total 10 pages.
Notice of Allowance dated Aug. 14, 2015 in corresponding U.S. Appl. No. 13/727,512, filed Dec. 26, 2012; total 7 pages.
Non-Final Office Action dated Aug. 13, 2015 in corresponding U.S. Appl. No. 14/684,948, filed Apr. 13, 2015; total 10 pages.
Notice of Allowance dated Dec. 28, 2015 in corresponding U.S. Appl. No. 14/684,948, filed Apr. 13, 2015; total 5 pages.
Non-Final Office Action dated Jul. 13, 2017 in corresponding U.S. Appl. No. 14/945,590, filed Nov. 19, 2015; total 14 pages.
Non-Final Office Action dated Jan. 18, 2018 in corresponding U.S. Appl. No. 14/945,590, filed Nov. 19, 2015; total 21 pages.
Final Office Action dated Aug. 28, 2018 in corresponding U.S. Appl. No. 14/945,590, filed Nov. 19, 2015; total 12 pages.
Notice of Allowance dated Nov. 16, 2018 in corresponding U.S. Appl. No. 14/945,590, filed Nov. 19, 2015; total 10 pages.
Non-Final Office Action dated Jul. 5, 2019 in corresponding U.S. Appl. No. 14/945,590, filed Nov. 19, 2015; total 15 pages.
Non-Final Office Action dated Mar. 13, 2017 in corresponding U.S. Appl. No. 15/005,953, filed Jan. 25, 2016; total 11 pages.

(56) References Cited

OTHER PUBLICATIONS

Final Office Action dated Sep. 26, 2017 in corresponding U.S. Appl. No. 15/005,953, filed Jan. 25, 2016; total 5 pages.
Notice of Allowance dated Dec. 21, 2017 in corresponding U.S. Appl. No. 15/005,953, filed Jan. 25, 2016; total 14 pages.
Non-Final Office Action dated May 4, 2017 in corresponding U.S. Appl. No. 15/087,713, filed Mar. 31, 2016; total 11 pages.
Final Office Action dated Oct. 16, 2017 in corresponding U.S. Appl. No. 15/087,713, filed Mar. 31, 2016; total 15 pages.
Notice of Allowance dated Jan. 24, 2018 in corresponding U.S. Appl. No. 15/087,713, filed Mar. 31, 2016; total 7 pages.
Non-Final Office Action dated Jul. 15, 2019 in corresponding U.S. Appl. No. 15/992,085, filed May 29, 2018; total 23 pages.
International Search Report and Written Opinion of the International Searching Authority dated Jan. 7, 2014 in corresponding International Application No. PCT/US2013/020586 filed Jan. 7, 2013; total 9 pages.
International Preliminary Report on Patentability dated Jul. 15, 2014 in corresponding International Application No. PCT/US2013/020586, filed Jan. 7, 2013; total 7 pages.

\* cited by examiner

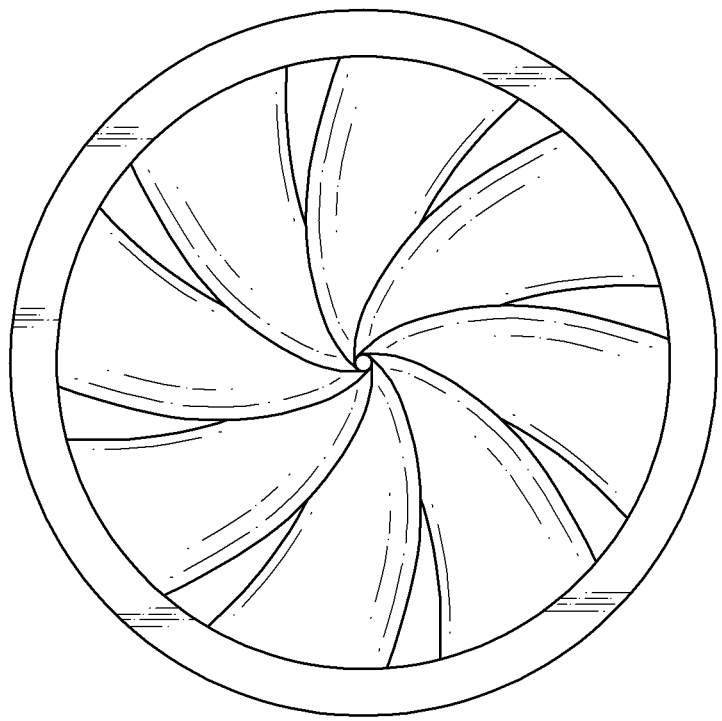
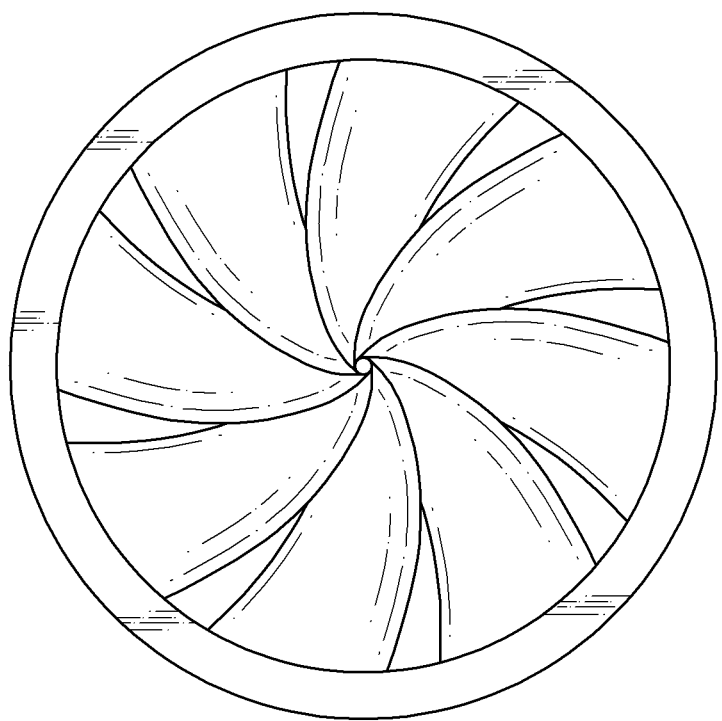
FIG. 8

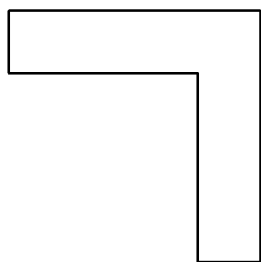
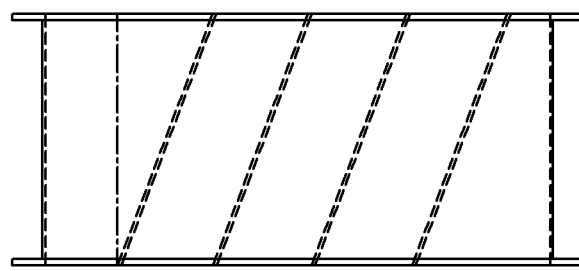
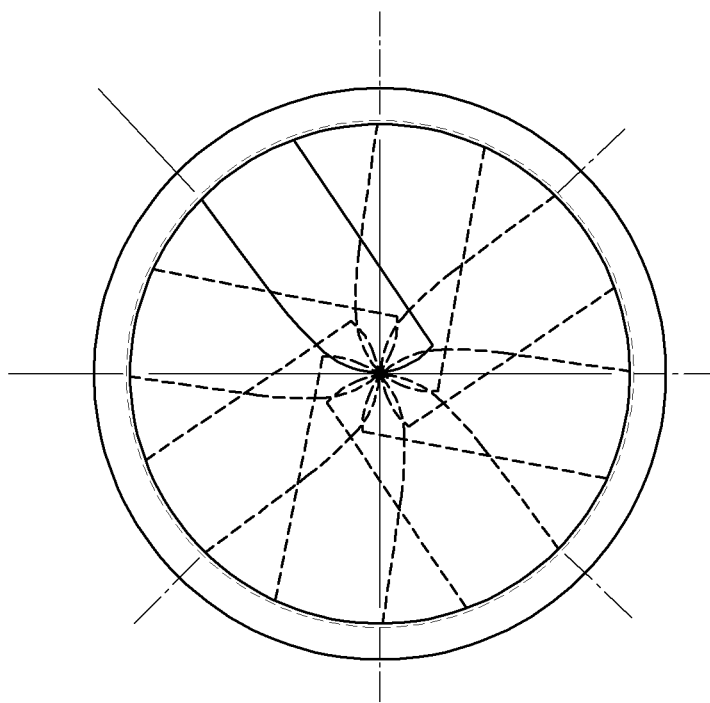
FIG.9

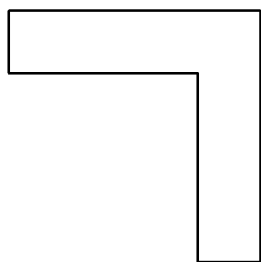
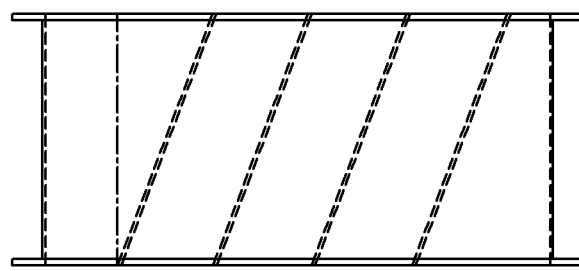
FIG. 10
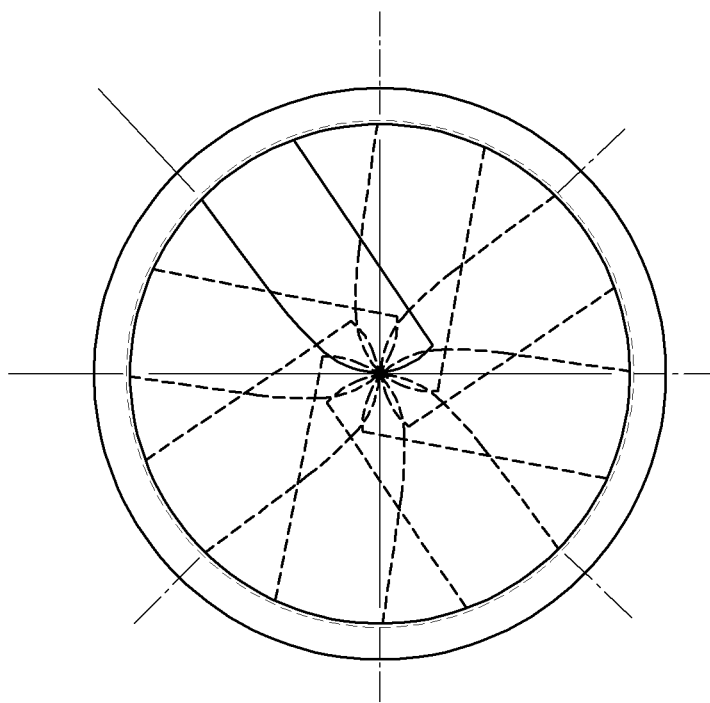

REMOVAL OF ATMOSPHERIC POLLUTANTS FROM GAS, RELATED APPARATUS, PROCESSES AND USES THEREOF

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of U.S. application Ser. No. 15/005,953, filed Jan. 25, 2016, now U.S. Pat. No. 9,950,295, which is a continuation of U.S. application Ser. No. 14/537,834, filed Nov. 10, 2014, now U.S. Pat. No. 9,272,257, which is a continuation of U.S. application Ser. No. 14/126,403, filed Dec. 13, 2013, now U.S. Pat. No. 8,883,105, which is the national phase under 35 U.S.C. § 371 of prior PCT International Application No. PCT/US2013/020586 which has an International Filing Date of Jan. 7, 2013, which designates the United States of America, and which claims the benefit of U.S. Provisional Application No. 61/584,347, filed Jan. 9, 2012, U.S. Provisional Application No. 61/656,192, filed Jun. 6, 2012, U.S. Provisional Application No. 61/715,149, filed Oct. 17, 2012, and U.S. Provisional Application No. 61/715,146, filed Oct. 17, 2012. Each of the aforementioned applications is incorporated by reference herein in its entirety, and each is hereby expressly made a part of this specification.

FIELD

Methods related generally to the removal of atmospheric pollutants from the gas phase, are provided, as well as related apparatus, processes and uses thereof.

BACKGROUND

Atmospheric pollutants include those gases, particles, radicals and other molecules that make their way into the atmosphere from other sources or form in the atmosphere from the chemical reactions of other molecules and energy sources. In general, atmospheric pollutants can damage the atmosphere by contributing to the "greenhouse effect", by breaking down the ozone layer, or by contributing to incidents of asthma and breathing problems. These pollutants are not merely confined to the outside, but can also be found in buildings. For example, many buildings have loading docks near an air intake system. When a truck pulls up to the loading dock, the truck exhaust can be pulled into the air intake system for a building and pollute the indoor air. There are also sources of atmospheric pollutants that originate from materials inside a building, such as carpet, paint, and commonly used chemicals.

Nitrogen oxides include a group of six compounds. Two members of this group, nitrogen oxide (NO) and nitrogen dioxide (NO2), often referred to as NOx, are reactive species that are considered problematic atmospheric pollutants and that are subject to regulatory control. The gases are regulated because of the large quantities produced through combustion and other chemical reactions and because of their adverse effects in atmospheric chemistry. More than 2 million tons of NOx were generated within the United States in 2011. Combustion typically produces 95% NO and 5% NO2 Nitric oxide, NO, is a significant reactive species in an atmospheric system, along with being present in several types of waste gases. It is the key component in the chain oxidation of organics, which is brought about initially by the radical product of the reaction of hydroxyl radical with organic compounds then adding an ozone molecule to the open radical site. NO scavenges an oxygen atom from the radical organic species to form NO2. In ambient air, there are other important mechanisms by which NO is quickly converted to NO2, including the following (wherein R is an organic moiety):

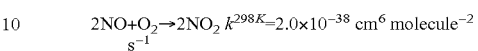

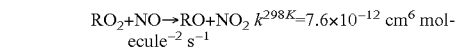

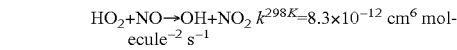

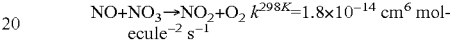

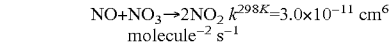

A significant observation from the reactions above is that NO and ozone do not reside in the same system in significant concentrations, since NO reacts with ozone quite rapidly comparatively. NO can also react with RO and OH radicals, which have been called "nighttime storage reactions" for NO. Those two reactions are effective until dawn, because MONO and RONO will rapidly photolyze when the sun rises. Researchers have observed that when benzene and NO are in the same system, there is a direct reaction between the two where a series of nitrophenols are formed.

The product of most of the NO reactions, NO2, is also responsible for several important reactions in the atmosphere. The first significant reactions for NO2 are its reaction with ozone to form nitrate radical and oxygen or nitric oxide and two molecules of oxygen in reactions (14) and (15) below. This reaction is similar to the reaction of nitric oxide and ozone, in that neither molecule can simultaneously reside in the atmosphere in large concentrations. The nitrogen dioxide and ozone reaction has been attributed to the broad class of "nighttime chemistry" that NOx is responsible for in the atmosphere. NOx chemistry is important because many of its reactions do not require light, unlike several of the oxygen reactions. Ozone concentration in the atmosphere is at its lowest at nighttime, and therefore, NOx species can interact with other reactive species without automatically getting quenched by ozone. The significant reactions of NO2 in the atmosphere are as follows:

(13)

(14)

(15)

(16)

(17)

-continued $$NO_2 + O(^3P) \xrightarrow{a} NO + O_2 \xrightarrow{M(b)} NO_3 \quad (18,19)$$

$$NO_2 + HO_2 \underset{M}{\rightleftharpoons} HO_2NO_2 \quad (20,21)$$

$$NO_2 + RO_2 \underset{M}{\rightleftharpoons} RO_2NO_2 \quad (22)$$

$$NO_2 + RO \xrightarrow{M(a)} RONO_2 \xrightarrow{b} HONO + R_1R_2CO \quad (23)$$

Reaction (13) is important environmentally because it is a source of nitric acid in the troposphere. Nitric acid contributes significantly to acid rain and fogs during the daytime, since most of the hydroxyl radical in the atmosphere is formed during daylight hours. Reactions (14) and (19) are chemically important because the highly reactive nitrate radical is formed.

Nitrate radical has been shown by researchers to be highly reactive, especially with organic compounds, such as simple alkenes and aldehydes. High nitrate radical concentrations have been spectroscopically observed in polluted urban areas. The primary time of day that the nitrate radical is most reactive is at night. The reaction of nitrate radical with the cresols and phenols is considered a significant sink for these organics at night. Nitric acid is formed in this reaction scheme, which is an undesirable product in the atmosphere.

Research is currently being conducted to review NOx production in air systems. One possibility for NOx compound formation is through the reaction of NNH and oxygen atoms. This scheme is as follows:

$$NNH \leftrightarrow N_2 + H \quad (24)$$

$$NNH + O_2 \leftrightarrow HNNOO \leftrightarrow NNOOH \rightarrow N_2 + HO_2 \text{ or } N_2O + OH \quad (25)$$

$$NNH + OH \leftrightarrow HONH \rightarrow N_2 + H_2O \quad (26)$$

$$NNH + O \rightarrow N_2 + OH \quad (27)$$

$$NNH + O \rightarrow N_2O + H \quad (28)$$

$$NNH + O \leftrightarrow NH + NO \quad (29)$$

Reaction (24) shows the initial formation of NNH and is rapid on both sides of the reaction leading to a quickly established equilibrium. Once NNH is formed in the system, reactions (25)-(29) proceed at relatively high rates of reaction. Therefore, there are new possibilities for gas-phase formation of NOx species in an air system.

Sulfur oxides (SOx) are compounds of sulfur and oxygen molecules. Sulfur dioxide ($SO_2$) is the predominant form found in the lower atmosphere. It is a colorless gas that can be detected by taste and smell in the range of 1,000 to 3,000 micrograms per cubic meter ($\mu g/m^3$). At concentrations of 10,000 $\mu g/m^3$, it has a pungent, unpleasant odor. Sulfur dioxide dissolves readily in water present in the atmosphere to form sulfurous acid ($H_2SO_3$). About 30% of the sulfur dioxide in the atmosphere is converted to sulfate aerosol (acid aerosol), which is removed through wet or dry deposition processes. Sulfur trioxide ($SO_3$), another oxide of sulfur, is either emitted directly into the atmosphere or produced from sulfur dioxide and is rapidly converted to sulfuric acid ($H_2SO_4$).

Most sulfur dioxide is produced by burning fuels containing sulfur or by roasting metal sulfide ores, although there are natural sources of sulfur dioxide (accounting for 35-65% of total sulfur dioxide emissions) such as volcanoes. Thermal power plants burning high-sulfur coal or heating oil are generally the main sources of anthropogenic sulfur dioxide emissions worldwide, followed by industrial boilers and nonferrous metal smelters. Emissions from domestic coal burning and from vehicles can also contribute to high local ambient concentrations of sulfur dioxide.

Sulfur dioxide is a major air pollutant and has significant impacts upon human health. In addition the concentration of sulfur dioxide in the atmosphere can influence the habitat suitability for plant communities as well as animal life. Sulfur dioxide emissions are a precursor to acid rain and atmospheric particulates. Due largely to the US EPA's Acid Rain Program, the U.S. has witnessed a 33% decrease in emissions between 1983 and 2002. This improvement resulted in part from flue-gas desulfurization, a technology that enables $SO_2$ to be chemically bound in power plants burning sulfur-containing coal or oil. In particular, calcium oxide (lime) reacts with sulfur dioxide to form calcium sulfite. Aerobic oxidation of the $CaSO_3$ gives $CaSO_4$, anhydrite. Most gypsum sold in Europe comes from flue-gas desulfurization. Sulfur can be removed from coal during the burning process by using limestone as a bed material in Fluidized bed combustion. Sulfur can also be removed from fuels prior to burning the fuel. This prevents the formation of $SO_2$ because there is no sulfur in the fuel from which $SO_2$ can be formed. The Claus process is used in refineries to produce sulfur as a byproduct. The Stretford process has also been used to remove sulfur from fuel. Redox processes using iron oxides can also be used, for example, Lo-Cat or Sulferox. Fuel additives, such as calcium additives and magnesium oxide, are being used in gasoline and diesel engines in order to lower the emission of sulfur dioxide gases into the atmosphere. As of 2006, China was the world's largest sulfur dioxide polluter, with 2005 emissions estimated to be 25.49 million tons. This amount represents a 27% increase since 2000, and is roughly comparable with U.S. emissions in 1980.

Sulfur dioxide is the product of the burning of sulfur or of burning materials that contain sulfur:

$$S_8 + 8O_2 \rightarrow 8SO_2$$

The combustion of hydrogen sulfide and organosulfur compounds proceeds similarly.

$$2H_2S + 3O_2 \rightarrow 2H_2O + 2SO_2$$

The roasting of sulfide ores such as pyrite, sphalerite, and cinnabar (mercury sulfide) also releases $SO_2$:

$$4FeS_2 + 11O_2 \rightarrow 2Fe_2O_3 + 8SO_2$$

$$2ZnS + 3O_2 \rightarrow 2ZnO + 2SO_2$$

$$HgS + O_2 \rightarrow Mg + SO_2$$

$$4FeS + 7O_2 \rightarrow 2Fe_2O_3 + 4SO_2$$

A combination of these reactions is responsible for the largest source of sulfur dioxide, volcanic eruptions. These events can release millions of tons of $SO_2$.

Sulfur dioxide is also a by-product in the manufacture of calcium silicate cement. $CaSO_4$ is heated with coke and sand in this process.

$$2CaSO_4 + 2SiO_2 + C \rightarrow 2CaSiO_3 + 2SO_2 + CO_2$$

The action of hot sulfuric acid on copper turnings produces sulfur dioxide.

$$Cu+2H_2SO_4 \rightarrow CuSO_4+SO_2+2H_2O$$

Sulfite results from the reaction of aqueous base and sulfur dioxide. The reverse reaction involves acidification of sodium metabisulfite:

$$H_2SO_4+Na_2S_2O_5 \rightarrow 2SO_2+Na_2SO_4+H_2O$$

Treatment of basic solutions with sulfur dioxide affords sulfite salts:

$$SO_2+2NaOH \rightarrow Na_2SO_3+H_2O$$

Featuring sulfur in the +4 oxidation state, sulfur dioxide is a reducing agent. It is oxidized by halogens to give the sulfuryl halides, such as sulfuryl chloride:

$$SO_2+Cl_2 \rightarrow SO_2Cl_2$$

Sulfur dioxide is the oxidizing agent in the Claus process, which is conducted on a large scale in oil refineries. Here sulfur dioxide is reduced by hydrogen sulfide to give elemental sulfur:

$$SO_2+2H_2S \rightarrow 3S+2H_2O$$

The sequential oxidation of sulfur dioxide followed by its hydration is used in the production of sulfuric acid.

$$2SO_2+2H_2O+O_2 \rightarrow 2H_2SO_4$$

Carbon bed adsorption, or adsorption by another material, is a process that does not convert the components of waste gases to other compounds as part of the process. Adsorption is an effective way of reducing the concentration of components in a waste gas stream at a low flow rate.

The contaminated gas flows through the bed, where the components of the waste gas can be adsorbed onto the bed material. There are, however, several problems with carbon bed adsorption. First, the choice of the bed material is one of the critical factors in the success of the component removal. Activated carbon, molecular sieves, activated alumina, and activated silica are common bed materials, although activated carbon is commercially the material of choice. The composition of the bed material influences which waste gas component is adsorbed and which components pass through the system and into the outlet air stream. Therefore, it is helpful if the operator knows the contaminants of the air sample that is being cleaned.

Second, the adsorption technique does not break down the components of the waste gas into smaller and/or other compounds; it only collects them on the bed material. Once the bed becomes saturated, it is taken off line and cleaned. The cleaning process can involve simply steam cleaning the bed, or regeneration, or can involve using a solvent combined with steam cleaning to remove captured waste gas components. The waste products from this process are then collected and disposed of by an environmentally safe procedure. The most common procedure is to separate the waste gas components from the aqueous phase that was produced by the steam cleaning process. This is time consuming, labor intensive and costly.

Another problem with the adsorption technique is that it requires more than one bed in parallel and sometimes in series. The adsorption process requires beds in parallel so that when one bed becomes saturated, it can be taken off line and the other bed put into subsequent use. Sometimes, it becomes advantageous to put beds in series so that large concentrations of waste gas components can be removed. The operator can also put beds made of different material in series to target different combinations of waste gases. These adsorption beds are quite bulky, since their average depth is one to three feet, therefore this process can be undesirable if space is limited. The arrangement of beds in series and parallel add to the consumption of time, labor and money in cooling and cleaning of the waste and the bed material.

Absorption is the process by which part of a gas mixture is transferred to a liquid based on the preferential solubility of the gas in the liquid. This process is used most often to remove acid stack gases, but it is a complex and costly method of control and removal of other components of waste gases. The high cost of the process is based on the choice of the absorbent and the choice of the stripping agent. Absorption is limited in its utility and not widely implemented in small industrial settings.

Plasmas are electrical discharges that form between electrodes. There are five general classes of nonequilibrium plasmas that can be used in some capacity for chemical processing, including synthesis and decomposition: the glow discharge, tire silent discharge, the RF discharge, the microwave discharge, and the corona discharge. Each class is specific based on the mechanism used for its generation, the range of pressure that is applicable during its use, and the electrode geometry.

While electrical discharges are effective in breaking down components of waste gases into other compounds and components, it is clear that in each of these discharge arrangements, they require a power source (in some cases a significant one), may not be able to handle industrial scale treatment without honeycombed and serial designs of the discharges, and are generally designed to combat complicated waste gas streams that comprise various components, including ozone, NOx and volatile organic compounds.

Wet scrubbing methods are conventionally employed for removal of particulates, SOx and NOx from waste gas streams. For waste gas streams that contain a significant amount of NOx, whether it was an original contaminant or the result of chemical conversion of a volatile organic component, conventional technologies, such as those described earlier, may not be able to efficiently handle the NOx load on an industrial scale. Conventional technologies for industrial scale NOx treatment typically treat the NOx with two or three stage wet scrubbing technologies. The most common currently used is a three stage process: Stage 1 converts NO into $NO_2$. Stage 2 chemically transforms the $NO_2$ into other nitrogen containing compounds. Stage 3 removes odors created in the second stage. Literature shows a number of chemical reactants, some of which were outlined earlier, that are utilized in this and other multi stage NOx treatment technologies. These include nitric acid and hydrogen peroxide, sodium hydrosulfide and hydrogen peroxide, or ozone gas and sodium chlorite solution, feme salt solutions and others. All of these are relatively effective, but each has pronounced limitations in operating costs, equipment costs or removal efficiency.

Conventional research has described chlorine dioxide's ability to convert NO into $NO_2$, which has typically been described in literature as occurring in a wet scrubbing apparatus according to equation 30 below. Researchers in this area also describe the use of sodium chlorite in water solution within a packed bed or tray type scrubbing or other wet scrubbing apparatus to convert $NO_2$ into nitric and hydrochloric acid as described in equation 31 below.

$$2NO+ClO_2+H_2O \rightarrow NO_2+HNO_3+HCl \tag{30}$$

$$4NO_2+NaClO_2+2H_2O \rightarrow 4HNO_3+NaCl \tag{31}$$

As shown in many of these conventional applications where waste gas volumes are small, NOx and SOx can be adsorbed on carbon and other porous solid materials or absorbed into liquids like sodium hydroxide and water. Although useful in small volume applications, the technologies are not economically practical for industrial applications that produce tens of thousands of cubic feet per minute of waste gas containing NOx and SOx. Catalysts provide another technical option; they can reduce NOx into nitrogen compounds that are not considered pollutants. Catalysts are effective on gas streams with small oxygen concentrations. Unfortunately most industrially produced NOx waste gas streams also contain high oxygen concentrations, so this technology is not applicable.

Methods known in the art for abating nitrogen oxides using, e.g., chlorine dioxide, include those of U.S. Pat. No. 4,119,702 to Azuhata et al., U.S. Pat. No. 3,957,949 to Senjo et al., and U.S. Pat. No. 3,023,076 to Ernst Karwat.

SUMMARY

Accordingly, it would be desirable to develop, produce and utilize an apparatus and related process that converts NOx and/or SOx in a waste gas stream to other compounds, molecules or atoms, wherein the apparatus and process achieves one or more of the following goals: a) can operate on an industrial scale, b) does not require significant amounts of energy from outside sources, c) can process waste gases in the gas phase with low, medium and high amounts of humidity (including liquid and/or aqueous phase materials), d) can process waste gases in the liquid or aqueous phase, e) is cost efficient relative to the scale of the process, f) is generally easy to install and operate, and g) can effectively operate as a single stage unit.

Current methods of cleaning air, such as catalytic oxidation, condensation, absorption, and carbon bed adsorption, are in general bulky, expensive, and maintenance intensive. Therefore, a process that could minimize these problems found with the currently used methods would be a beneficial next step in the development of better technology for air quality control. An ideal process can control low concentrations NOx in air, as well as successfully controlling larger concentrations of NOx that are present in the same air sample.

A single-stage air scrubbing apparatus is disclosed that includes: at least one reaction vessel having a first end, a second end, an enclosure, comprising at least one wall, a volume within enclosure and a residence time component, at least one introduction duct that is coupled to the reaction vessel, and a turbulence component, wherein the residence time component is sufficient to allow the conversion of at least one atmospheric pollution compound to at least one other compound, molecule or atom. In some embodiments, the at least one atmospheric pollution compound comprises nitrogen oxide, sulfur oxide or a combination thereof.

Additionally, methods of removing atmospheric pollution compounds from a waste gas stream are disclosed that include: providing a single-stage air scrubbing apparatus, providing a waste gas stream having at least one atmospheric pollution compound, providing at least one additional gas stream, mist stream, liquid stream or combination thereof, introducing the waste gas stream and the at least one additional gas stream, mist stream, liquid stream or combination thereof into the single-stage air scrubbing apparatus at a flow rate sufficient to allow for conversion of the at least one atmospheric pollution compound to at least one other compound, molecule or atom, and converting the at least one atmospheric pollution compound to at least one other compound, molecule or atom.

In a first aspect, a method is provided for scrubbing a waste gas, comprising, introducing into a reaction vessel a waste gas containing at least one component selected from the group consisting of a sulfur oxide and a nitrogen oxide, introducing chlorine dioxide into the reaction vessel; introducing turbulence into a mixture of the waste gas and the chlorine dioxide, whereby the chlorine dioxide reacts with the component, such that the component is converted into at least one other compound, molecule or atom.

In an embodiment of the first aspect, the chlorine dioxide is in gaseous form.

In an embodiment of the first aspect, the chlorine dioxide reacts with the component under conditions of ambient temperature and ambient humidity.

In an embodiment of the first aspect, the chlorine dioxide is introduced into the reaction vessel via at least one introduction duct.

In an embodiment of the first aspect, turbulence is introduced by passing at least one of the waste gas and the chlorine dioxide through a set of two or more blades in a fan configuration.

In an embodiment of the first aspect, turbulence is introduced by passing at least one of the waste gas and the chlorine dioxide through a plurality of tubes arranged in a parallel configuration, wherein each tube is positioned at an angle of from 5 to 95 degrees off an axis of the reaction vessel, and wherein each tube is less than 0.5 meters in length.

In an embodiment of the first aspect, the mixture is passed through two or more reaction vessels arranged in series.

In an embodiment of the first aspect, a sensor for detection of at least one of the component, compound, molecule, or atom is positioned at an exit from the reaction vessel, and wherein a measurement by the sensor is employed to adjust an amount of at least one of the waste gas and chlorine dioxide in the mixture so as to increase a rate and/or an amount of reaction of the component.

In an embodiment of the first aspect, a residence time of the mixture in the reactor is 1.5 seconds or less, and wherein a conversion of the component of at least 99% is achieved.

In a second aspect, a system is provided for scrubbing a waste gas of at least one of nitrogen oxides and sulfur oxides, comprising: an inlet for introducing chlorine dioxide into the reaction vessel; and an inlet for introducing waste gas into the reaction vessel; and a reaction vessel, wherein the reaction vessel is equipped with one or more turbulence inducing devices for inducing turbulence in a mixture of the waste gas and the chlorine dioxide.

In an embodiment of the second aspect, the system further comprises at least one sensor positioned in an outlet of the reaction vessel, wherein the sensor is configured to measure at least one of sulfur oxide, nitrogen oxide, water, or temperature.

In an embodiment of the second aspect, the reaction vessel is configured such that a residence time of a 1.5 seconds or less.

In an embodiment of the second aspect, the turbulence inducing device is selected from the group consisting of vanes, baffles, diffusers, and tube arrays.

In an embodiment of the second aspect, the system further comprises at least one additional reaction vessel, wherein the reaction vessels are arranged in series.

In an embodiment of the second aspect, a gas velocity of the mixture is less than about 2500 feet per minute In a third aspect, a single-stage air scrubbing apparatus is provided, comprising: at least one reaction vessel having a first end, a second end, an enclosure, comprising at least one wall, a volume within enclosure and a residence time component, at least one introduction duct that is coupled to the reaction vessel, and a turbulence component, wherein the residence time component is sufficient to allow the conversion of at least one atmospheric pollution compound to at least one other compound, molecule or atom.

In an embodiment of the third aspect, the at least one atmospheric pollution compound comprises nitrogen oxide, sulfur dioxide or a combination thereof.

In an embodiment of the third aspect, the at least one reaction vessel comprises two or more reaction vessels in series with one another.

In an embodiment of the third aspect, the at least one reaction vessel comprises two or more reaction vessels in parallel with one another.

In an embodiment of the third aspect, the air comprises gas, mist, liquid or a combination thereof.

In an embodiment of the third aspect, the at least one introduction duct is coupled to the first end, the second end, the at least one enclosure or a combination thereof.

In an embodiment of the third aspect, the reaction vessel has a circular cross-section, an oval cross-section, a triangular cross-section, a rectangular cross-section, a square cross-section or a combination thereof.

In an embodiment of the third aspect, the residence time component is greater than about 0.1 second.

In an embodiment of the third aspect, the residence time component is greater than about 0.5 second.

In an embodiment of die third aspect, the residence time component is greater than about 1.5 seconds.

In an embodiment of the third aspect, the at least one nitrogen oxide compound comprises nitric oxide, nitrogen dioxide or a combination thereof.

In a fourth aspect, a method is provided of removing atmospheric pollution compounds from a waste gas stream, comprising: providing a single-stage air scrubbing apparatus, providing a waste gas stream having at least one atmospheric pollution compound having a velocity, providing at least one additional gas stream, mist stream, liquid stream or combination thereof having a velocity, introducing the waste gas stream and the at least one additional gas stream, mist stream, liquid stream or combination thereof into the single-stage air scrubbing apparatus at a flow rate sufficient to allow for conversion of the at least one atmospheric pollution compound to at least one other compound, molecule or atom, and converting the at least one atmospheric pollution compound to at least one other compound, molecule or atom.

In an embodiment of the fourth aspect, the at least one atmospheric pollution compound comprises nitrogen oxide, sulfur dioxide or a combination thereof.

In an embodiment of the fourth aspect, the gas velocity is less than about 2500 feet per minute.

In an embodiment of the fourth aspect, the gas velocity is less than about 1000 feet per minute.

The various embodiments of the various aspects, as well as the various aspects, can be employed in any suitable combination as desired.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

FIG. 8 is a photograph showing a spinner spool for introducing turbulence in the reactor.

FIG. 9 shows a top view schematic diagram of a first spinner spool of FIG. 8.

FIG. 10 shows a top view schematic diagram of a second spinner spool of FIG. 8.

DETAILED DESCRIPTION

Figure 1:
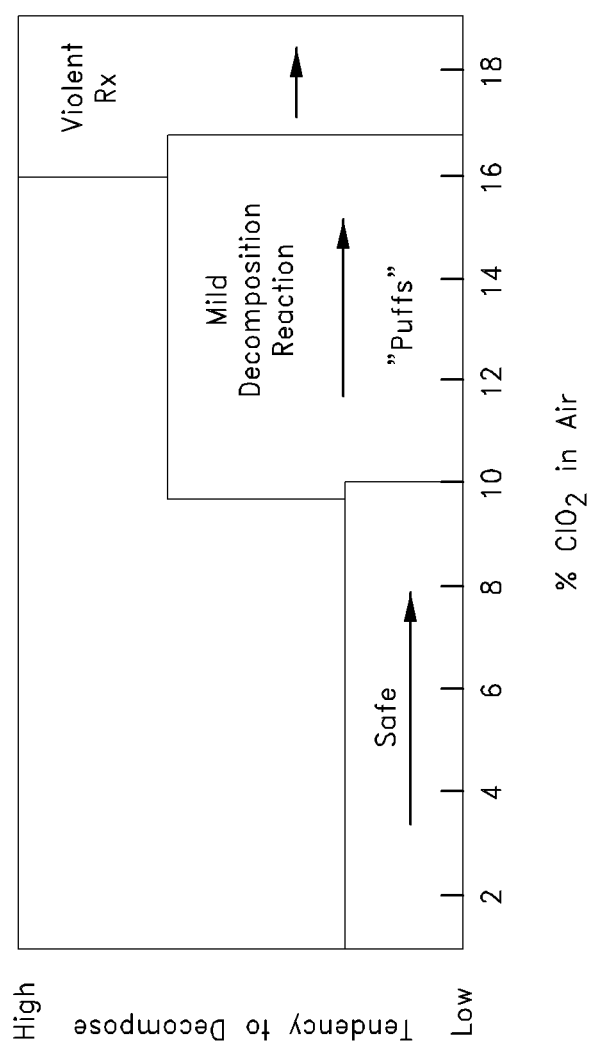
FIG. 1 shows the tendency to decompose as a function of % chlorine dioxide in air (based on technical bulletin by Basic Chemicals).

The following description and examples illustrate some exemplary embodiments of the disclosed invention in detail. Those of skill in the art will recognize that there are numerous variations and modifications of this invention that are encompassed by its scope. Accordingly, the description of a certain exemplary embodiment should not be deemed to limit the scope of the present invention.

An apparatus and related processes have been developed that convert atmospheric pollution compounds, including NOx and/or SOx, in a waste gas stream to other compounds, molecules or atoms, wherein the apparatus and process may achieve one or more of the following goals: a) operates on an industrial scale, b) does not require significant amounts of energy from outside sources, c) processes waste gases in the gas phase with low, medium and high amounts of humidity, d) processes waste gases in the liquid or aqueous phase, e) is cost efficient relative to the scale of the process, f) is generally easy to install and operate, and g) effectively operates as a single stage unit, regardless of how many reaction vessels are included.

Chlorine dioxide is a powerful oxidizing agent. Chlorine dioxide can react with fluoride, fluoroamines, carbon monoxide, hydrogen, ammonia, phosphine, platinum, phosphorus, potassium hydroxide, ethane, propane and methane. It reacts with steam or water to produce hydrochloric acid. Chlorine dioxide can react with NOx and SOx, making it useful for scrubbing waste gas containing these compounds. Contemplated embodiments include processes and apparatus that remove NOx and SOx from industrial waste gas or other gas that contains NOx (converts both NO and $NO_2$ into mineral acids) and/or SOx. Contemplated processes involve a chemical reaction between chlorine dioxide gas ($ClO_2$) and the NOx in a single stage air or mist type scrubbing apparatus. Contemplated processes utilize $ClO_2$ to remove NOx from industrial waste gas (or other gases containing NOx) in two ways: a) a reaction(s) between the NOx in the waste gas and gaseous chlorine dioxide that is dissolved in a aqueous solution, which may be at any suitable pH, including acidic, neutral or basic, and b) a reaction between $ClO_2$ gas and NOx in a waste gas with high relative humidity. Both reaction types can proceed according to the paths described in reaction (32) and (33) below, but contemplated embodiments are not limited to any particular theory or presumed pathway. Both of these methods use a single stage air or mist scrubbing apparatus that is a major departure from the multi-stage wet scrubbing apparatus reported in prior art applications and utilized conventionally.

Contemplated apparatus and related processes convert NOx gases into other nitrogen containing compounds that are not considered pollutants and/or convert SOx gases into other sulfur containing compounds that are not considered pollutants. The technology of contemplated processes treats NOx and/or SOx more efficiently and with lower initial equipment and/or operating costs than the prior art processes described above. Although the present process has broad technical application, it offers a profound and immediate improvement in the treatment of industrially created NOx and/or SOx waste gas. The present process is applicable to industrial applications like chemically dissolving and pickling metals, stationary source combustion process flue gas, tail gas from nitric acid plants, shipboard combustion process flue gas and other sources of waste gas containing nitrogen oxides. This process efficiently treats NOx and/or SOx and is more cost effective to install and operate than currently available technologies for NOx and/or SOx treatment described in other patents and literature.

Specifically, a single-stage air scrubbing apparatus is provided to address one or more of the problems outlined earlier and includes: a reaction vessel having a first end, a second end, an enclosure, comprising at least one wall, a volume within the enclosure, and a residence time component, at least one introduction duct that is coupled to the reaction vessel, and a turbulence component, wherein the residence time component is sufficient to allow the conversion of at least one nitrogen oxide and/or sulfur oxide compound to at least one other compound, molecule or atom. For mist-based $ClO_2$ processes, residence times of about 0.15 seconds to 15 seconds, are generally preferred, preferably 0.5 or 1 second to about 1.5, 2, 2.5, or 3 seconds, with approximately 1.5 seconds generally preferred. For gas-based $ClO_2$ processes, residence times of about 0.015 seconds to 1.5 seconds, are generally preferred, preferably 0.05 or 0.1 seconds to about 0.15, 0.2, or 0.3 seconds, with approximately 0.15 seconds generally preferred. However, in either mist or gas based processes, longer or shorter times can be employed in certain embodiments. Various reactor configurations can be employed to obtain a desired residence time in a particular apparatus footprint, depending upon construction and spacing constraints. For example, the reactor can be positioned vertically, horizontally, or positioned diagonally at any desired angle between 0 and 90°. The velocity through which the waste gas and chlorine dioxide passes through the reactor can be varied, with faster velocities in longer reactors and slower velocities in shorter reactors. The reactor can be of any suitable configuration, e.g., a straight tube, a helical coil, a tortuous path provided by a series of baffles in a cylindrical tube, a tube including a series of switchbacks, multiple parallel tubes, or any other suitable configuration. Pure waste gas can be added to the reactor along with the chlorine dioxide, or the gases can be diluted, e.g., with ambient air, or with inert gases, treated gas streams, or other gas streams including untreated gas streams. While it is generally preferred to operate the reactor at ambient temperatures (temperatures typically experienced outdoors in the various regions of the United States, e.g., −40° C. or lower to 40° C. or higher, typically 0° C. to about 25° C.), heating or cooling jackets for the reactor can be employed, or other devices for heating or cooling gases introduced into the reactor.

Good results derived from gas or mist phase scrubbing of NOx are discussed herein. For example, greater than 99 percent of the NOx can be converted to nitric acid and hydrochloric acid in approximately 1.5 seconds of residence time when mixed with gas phase chlorine dioxide in very moist air, e g air at a relative humidity of approximately 100%, or containing liquid water in aerosol form (e.g., a mist). It is typically desirable to operate the reactor at ambient conditions of humidity. Such relative humidity levels can range from 2% or below in extremely dry conditions to 100% relative humidity in coastal areas. More typical relative humidities are as low as 10%, more typically 30-60% for desert areas of the south western United States, to above 70% in non-desert areas. If higher moisture content is desired, then water can be added in vapor or mist form. Additional research shows that mist and dissolved $ClO_2$ provide effective conversion of NOx in about 15 seconds, and gas phase $ClO_2$ provide effective conversion of NOx in about 0.15 seconds. Increasing humidity or moisture can sometimes slow the reaction time. As noted above, conversion of greater than 99 percent of the NOx can be achieved. Similar conversion levels may be obtained for SOx. In other embodiments, lower conversions of SOx and/or NOx may be acceptably obtained, e.g., 50% or less up to 55, 60, 65, 70, 75, 80, 85, 90, 95, 96, 97, or 98%, or up to 99% or more. In certain embodiments, higher conversions may be obtained, e.g., 99.9%, or 99.99%, or 99.999% or more. Although a single pass reactor is typically preferred, serial reactors can advantageously be employed to provide higher conversion levels.

Good results are also seen when chlorine dioxide gas is dissolved in sodium hydroxide solution or other basic solutions with pH above 9, and introduced into the reactor in the form of a mist, however, with the appropriate chemistry considerations, a basic pH is not necessary for effective conversions of atmospheric pollutants. It is instructive to note that the solution pH is multifaceted issue. A high pH is not necessary for the some of the contemplated chlorine dioxide reactions shown here In fact, chlorine dioxide decomposes in high pH. Therefore, it is important that the chlorine dioxide is exposed to high pH for only a limited period of time. Fortunately, the chlorine dioxide decomposition rate is sufficiently slow that it allows a high pH reaction environment for the second or two necessary to decompose the NOx. A higher pH is introduced from $OH^-$, for example, because this environment converts the $NO_2$ into innocuous compounds. Sodium hydroxide is considerably less expensive than chlorine dioxide and its presence reduces the overall chemical cost in NOx destruction. There are several contemplated methods of introducing a high pH into the process. One is to insure the high pH liquid is introduced into the reaction chamber along with the chlorine dioxide gas. The second is to mix it with the liquid-containing dissolved chlorine dioxide just prior to injection into the reaction chamber. In a single mist scrubbing stage, NOx concentrations between 10 and 100 ppm containing both NO and $NO_2$ were converted to the acids. An optional second stage mist or wet scrubbing apparatus provides additional gas cleaning. This second stage can be designed to capture excess chlorine dioxide and/or acid fumes. While concentrations of from 10-100 ppm of NOx are desirably treated, in certain embodiments higher or lower concentrations may also be treated, e.g., from 1 ppm or less to 1000 ppm or more.

While single stage reactors are typically preferred, more than one reactor of preferred embodiments in series can be employed to achieve higher conversion rates (e.g., 2, 3, or more reactors in series). Multiple reactors of preferred embodiments in parallel can be employed to provide compact conversion of higher volumes of waste gas. A single stage reactor of a preferred embodiment can also be employed in connection with one or more other types of conventional reactors as described above, either for first pass removal of NOx and/or SOx or as an intermediate or final treatment step.

In another embodiment, at least one atmospheric pollutant can be effectively converted by scrubbing with gas phase $ClO_2$ in waste gas with ambient humidity and ambient temperatures as described elsewhere herein, and then direct the exit gas into a second stage scrubber that recirculates NaOH (or another basic compound). This second stage treats any remaining $NO_2$ and captures any extra $ClO_2$. The captured $ClO_2$ is useful in the treatment of NOx too. Furthermore, when the $ClO_2$ is generated using an electrochemical device, the effluent from the cells can be utilized in the second scrubbing stage to minimize the addition of NaOH so as to reduce operating costs.

Additionally, methods of removing atmospheric pollution compounds from a waste gas stream are disclosed that include, providing a single-stage air scrubbing apparatus, providing a waste gas stream having at least one atmospheric pollution compound, providing at least one additional gas stream, mist stream, liquid stream or combination thereof, introducing the waste gas stream and the at least one additional gas stream, mist stream, liquid stream or combination thereof into the single-stage air scrubbing apparatus at a flow rate sufficient to allow for conversion of the at least one atmospheric pollution compound to at least one other compound, molecule or atom, and converting the at least one atmospheric pollution compound to at least one other compound, molecule or atom.

In contemplated embodiments, NOx-containing gas and/or SOx-containing gas (which are referred to herein as "waste gas" or "gas" or even at times "waste air") is streamed through a vessel at a suitable gas velocity for conversion and scrubbing waste gas. In some contemplated embodiments, a contemplated gas velocity is less than about 2500 feet per minute. In other contemplated embodiments, a contemplated gas velocity is less than about 2000 feet per minute. In yet other contemplated embodiments, a contemplated gas velocity is less than about 1500 feet per minute In some contemplated embodiments, a contemplated gas velocity is less than 1000 feet per minute. Gas velocities of from 100 feet per minute or less to 5000 feet per minute or more can be employed. With these contemplated gas velocities, it is expected that a contemplated residence time of gas in the vessel is typically about 0.1 seconds or more to about 1.5 seconds or less, although in certain embodiments higher or lower residence times can be employed.

Contemplated reaction vessels are constructed of materials that are substantially impervious or resistant to reaction the waste gas and have a volume sufficient to contain the waste gas stream for a period of not less than about 0.1 second, and in many embodiments, not less than about 1.5 seconds. Suitable materials that can be employed for the reactor include PVC, fiberglass, steel, ceramic, and various composite materials. Contemplated reaction vessel designs may be any shape and comprise at least one wall. In some embodiments, a contemplated reaction vessel is cylindrical (having a circular cross-section profile) because this shape minimizes interference between the gas and the vessel walls. However, any reaction vessel design that allows for the possibility of formation of very small liquid droplets and minimal coalescing of moisture within the reaction chamber is contemplated, even if it is not cylindrical. It is preferably understood that there are embodiments where liquid droplets and moisture do not form, however, these components are preferably designed to withstand and address many different types of waste gases, treatment conditions and resulting components. Therefore, if the design considerations are reviewed to provide sufficient residence time, along with a lack of moisture coalescence, then any design may be used, including rectangular, oval, triangular, conical or a combination thereof.

As mentioned, contemplated apparatus comprise at least one introduction duct that is coupled to the reaction vessel. A contemplated waste gas is supplied or provided to the point of introduction to the reaction vessel through this at least one duct. The orientation of the duct is can be adjusted as desired to improve performance. In certain embodiments, performance can be enhanced by minimizing the interference between the gas and the vessel walls. Contemplated orientations include: a) at the center of the end of a cylindrical vessel, or b) at the side and tangentially aligned with circumference of a cylindrical vessel.

As previously discussed, contemplated embodiments also comprise a turbulence component. Contemplated turbulence components may comprise any single design or combination of designs wherein the turbulence component functions to introduce gas mixing by providing a swirl or turbulence to the waste gas or gas stream. In contemplated embodiments, the turbulence component is located such that it can add turbulence or mixing to the waste gas or gas stream before the gas comes into contact with the chlorine dioxide or when chlorine dioxide is introduced into a mist or liquid. When $ClO_2$ is introduced as a gas the mixing can occur before, during and/or after the $ClO_2$ is introduced, or before, during and/or after the $ClO_2$ is added to the gas stream containing NOx and/or SOx. $ClO_2$ can be added to the waste gas and/or the waste gas can be added to $ClO_2$. Waste gases of different compositions can be combined in various combinations with $ClO_2$ in various sequences, as desired.

Figure 5:
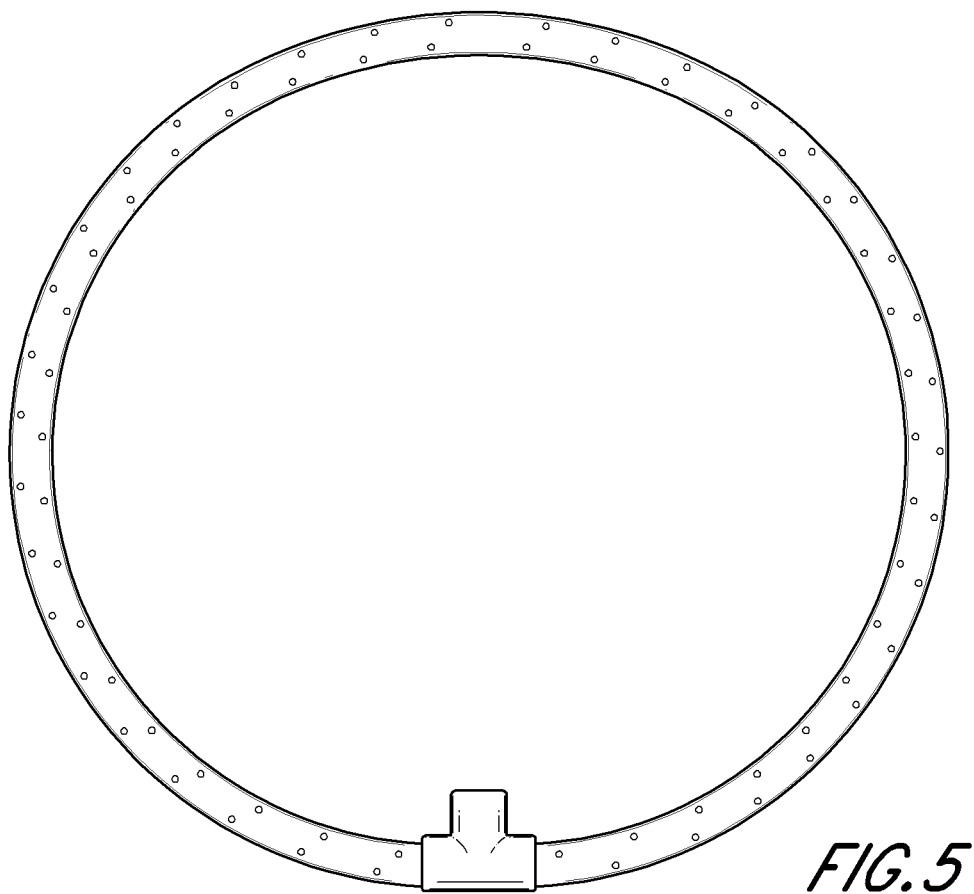
FIG. 5 is a photograph of a circular diffuser for introducing waste gas into a reactor of a preferred embodiment.
Figure 6:
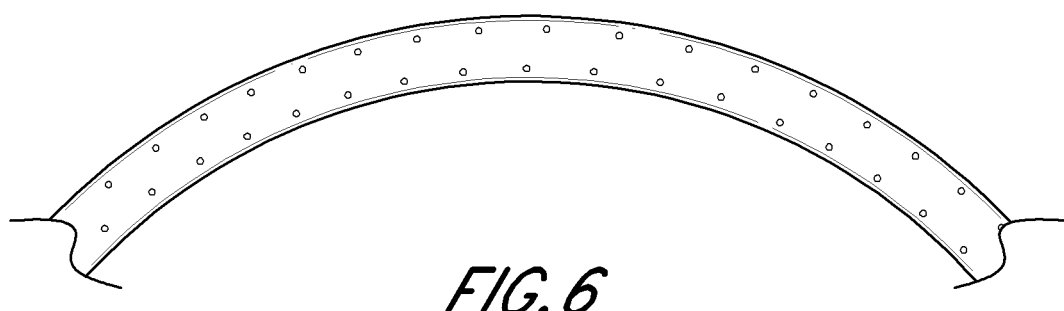
FIG. 6 is a photograph showing a close up of the circular diffuser of FIG. 6, including the arrangement of holes through which waste gas is introduced into the reactor.

FIGS. 5-6 are directed to a circular device for introducing gas into the reactor. The device includes a ring of PVC pipe with ends connected via a T-shaped connector. Gas is introduced into the T-shaped connector and diffuses out through a plurality of holes in the walls of the pipe (see detail in FIG. 6).

Figure 7:
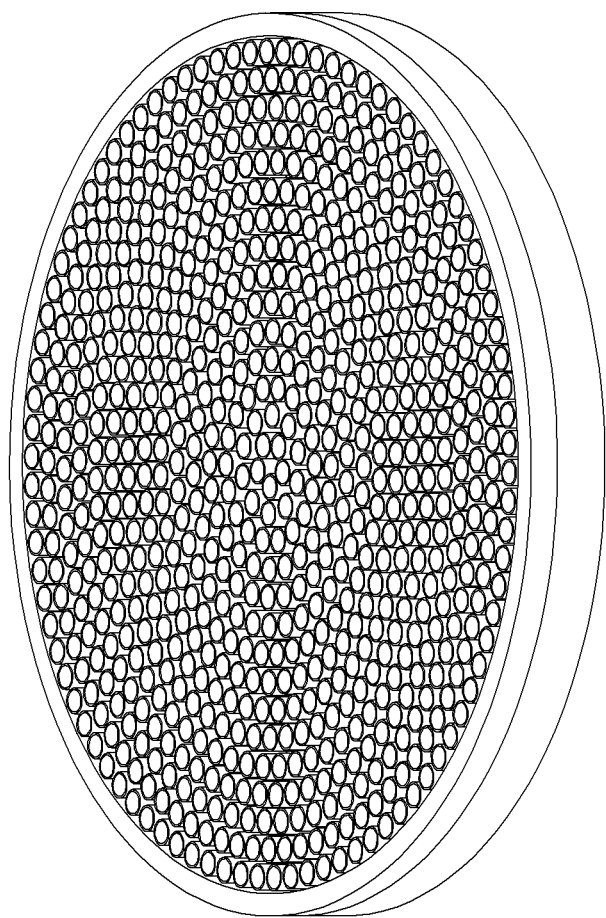
FIG. 7 is a photograph showing a reactor insert for introducing turbulence in the reactor.

FIG. 7 is directed to a device for introducing turbulence into the reactor. The device includes a bundle of short, small diameter PVC pipe lengths tilted at an angle to an axis of a sheath fabricated from a large diameter PVC pipe. The short, small diameter PVC pipe lengths are typically from about 2 inches in length or less to 12 inches in length or more, e.g., from 2, 3, 4, 5, or 6 to about 7, 8, 9, 10, 11 or 12 inches. Diameters are typically uniform, and from about 0.5 inches or less to about 2 inches or more, e.g., 0.5, 0.75, or 1 inch to about 1.25, 1.5, or 2 inches. The pipes are typically tilted off of the axis from 5 or less to 85 or more degrees, typically from about 5, 10, 15, 20, or 25 degrees to about 30, 35, 40, 45, 50, 55, 60, 65, 70, 75, 80, or 85 degrees. The tilted pipes are preferably arranged in a spiral pattern so as to maximize generated turbulence. The sheath typically has a diameter that facilitates placing the device in the flow path of the reactor, e.g., as a pipe forming a portion of the length of a reactor, or as an insert into the reactor having a diameter sufficiently small such that it can be inserted into the larger diameter reactor, but sufficiently large so as to provide a snug fit to encourage passage of substantially all gas therethrough. The device can be fabricated from any suitable material capable of tolerating exposure to the waste gas and chlorine dioxide.

FIGS. 8-10 are directed to spinner spools for introducing turbulence into the reactor. The blades of the spinner spool are tilted at an angle of 30 degrees, however, other angles such as are described above with respect to FIGS. 6-7 can be employed. Any suitable number of vanes can be employed, e.g., 2 to 30 or more, preferably, 3, 4, 5, 6, 7, 8, 9, or 10 to about 11, 12, 13, 14, 15, 16, 17, 18, 19, 20, 21, 22, 23, 24, 25, 26, 27, 28, 29, or 30.

While the configurations of FIGS. 6-10 are desirable for inducing turbulence in many configurations, other configurations can also be employed, e.g., screw shaped blades, baffles, plates with holes, etc. For energy conservation and robustness of equipment, stationary devices for inducing turbulence are particularly desired; however, moving fans, blowers, mixers, and the like may also be employed in certain embodiments.

In some embodiments, when the waste gas is introduced at the center of the end of a cylindrical reaction vessel, a contemplated turbulence component is placed in the duct just prior to the point where the gas enters the vessel, or it may be placed at the beginning of the vessel just after the waste gas enters the vessel or the reaction can occur in the duct with no need for a reaction vessel. Multiple turbulence components can be employed, spaced evenly or irregularly along the reaction vessel, e.g., 1, 2, 3, 4, 5, 6, 7, 8, 9, 10, 11, 12, 13, 14, 15, or more. The waste gas and/or the $ClO_2$ can be introduced via one inlet, or a plurality of inlets, e.g., 5, 10, 20, 30, 40, 50, or 100 or more inlets, of various spacings and configurations. The waste gas and/or $ClO_2$ can be introduced in undiluted (or pure) form, or mixed with, e.g., air, inert gas (e.g., argon, nitrogen or $CO_2$), water, or the like, or with another reactive component. The configuration of the vessel can be adjusted to account for the moisture associated with the $ClO_2$ when it is introduced into the reaction vessel. In other contemplated embodiments, when the waste gas is introduced at the side and tangentially aligned with circumference of a cylindrical reaction vessel, a contemplated turbulence component is located at a position to swirl or mix the gas in the duct just prior to the point where the waste gas enters the vessel. In other contemplated embodiments, if a rectangular or other reaction vessel configuration is used, then the turbulence component preferably minimizes collision between the vessel walls and gas turbulence within the reaction vessel when the $ClO_2$ is introduced in a mist or liquid phase.

In embodiments where the chlorine dioxide is dissolved in a liquid, e.g., water, a chlorine dioxide fluid material or aqueous material is sprayed, released or propelled into the waste gas stream. In contemplated embodiments, the chlorine dioxide fluid material is sprayed, released or propelled a point just downstream of the point at which the gas is swirled by the turbulence component, and in many embodiments, through a single nozzle. In some contemplated embodiments, a reaction vessel comprises a single nozzle for this purpose that is located just downstream of the point where the gas is swirled. However, in other embodiments, such as where non-cylindrical reaction vessels are utilized, it may be desirable to utilize multiple nozzles. In cases where multiple nozzles are used, it may also be beneficial for the gas coming out of each nozzle to spin in opposite directions. In these cases, gas mixing is optimized and gas turbulence is minimized.

In contemplated embodiments, the nozzle orientation is centered with the axis of the gas flow and provides a full cone or other full surface pattern that evenly disperses the material projected from the nozzle into the entire waste gas stream. In contemplated embodiments, the rate of release from the nozzle may be calibrated so that it is at least twice the velocity of the waste gas stream. When the nozzle is emitting a liquid it preferably produces droplets of that liquid with a mean diameter of about 100 microns or less. In these instances, it is important to remain below the dew point of the gas, and thereby prevent formation of liquid droplets, especially those with a larger mean diameter.

Contemplated liquids may be formed from a condensed spray, but may also be formed from other methods and/or apparatus. Contemplated liquids could, and usually would, contain high concentrations of HCl and $HNO_3$. Therefore, contemplated reaction vessels may comprise a drain at a low point in the vessel to allow the removal of that liquid. In some applications, depending upon other contaminants in the waste gas and the pH of the moisture (fluid material) added to the waste gas, this condensate acid mix can be of commercial value.

When chlorine dioxide gas in introduced into a waste stream, it is preferably introduced in stoichiometric excess for reaction with components to be reacted, e.g., SOx and NOx. For example, the chlorine dioxide can be present in concentrations or amount or levels greater than merely sufficient to react with the NOx as set forth in equations 32 & 33 below). It is understood, however, that the chlorine dioxide in gaseous form is neutral, meaning that it is not the ionic $ClO_2^-$ that is formed when $NaClO_2$ is dissolved in water. The ionic form is useful for $NO_2$ conversion into acids, but is not useful in the conversion of NO to $NO_2$.

In some contemplated embodiments, the $ClO_2$ gas is generated on site and introduced (sprayed) into the waste gas through one or more nozzles described above, as either a liquid or gas. Liquid has advantages and is used in some embodiments unless the NOx concentration in the waste gas requires more $ClO_2$ than can be safely dissolved into an aqueous solution. And the waste gas humidity is sufficiently low to allow the introduction of liquid without exceeding 100% humidity. The dissolved $ClO_2$ gas concentration in aqueous solutions typically should not exceed 3000 ppm for safety reasons, but systems may be designed such that this concentration can be safely exceeded.

The stability of chlorine dioxide includes three primary variables: temperature, pressure and concentration. The parameters have been studied systematically by Ri Ya Jin et al and Basic Chemical Inc., and others, which make the point that there are a number of safe operating environments for chlorine dioxide. It is possible to safely utilize chlorine dioxide in the NOx scrubbing technology disclosed herein for a variety of industrial and municipal waste gas environments with significantly varied combinations of temperature and NOx concentration. This does not mean that chlorine dioxide will not decompose to chlorine and oxygen below 9.5% in air. But the induction time is in several minutes as FIG. 2 shows.

There are three operational environments to consider when evaluating the safety and chemical availability of chlorine dioxide: gas storage, gas transport to reaction chamber, and within the reaction chamber. Each of these can be different. For example, it is only necessary to have the chlorine dioxide remain intact long enough within the reaction chamber to complete the desired reaction.

Several studies have been carried out to explore the conditions at which chlorine dioxide is explosive. At ambient temperature, chlorine dioxide does not explode below 9.5% in air by volume. Above this limit, spontaneous explosive decomposition is noticed with an induction time. Induction time decreases as the concentration of chlorine dioxide increases. Based on these one can plot the tendency to decompose as a function of % chlorine dioxide in air. (FIG. 1)

Figure 2:
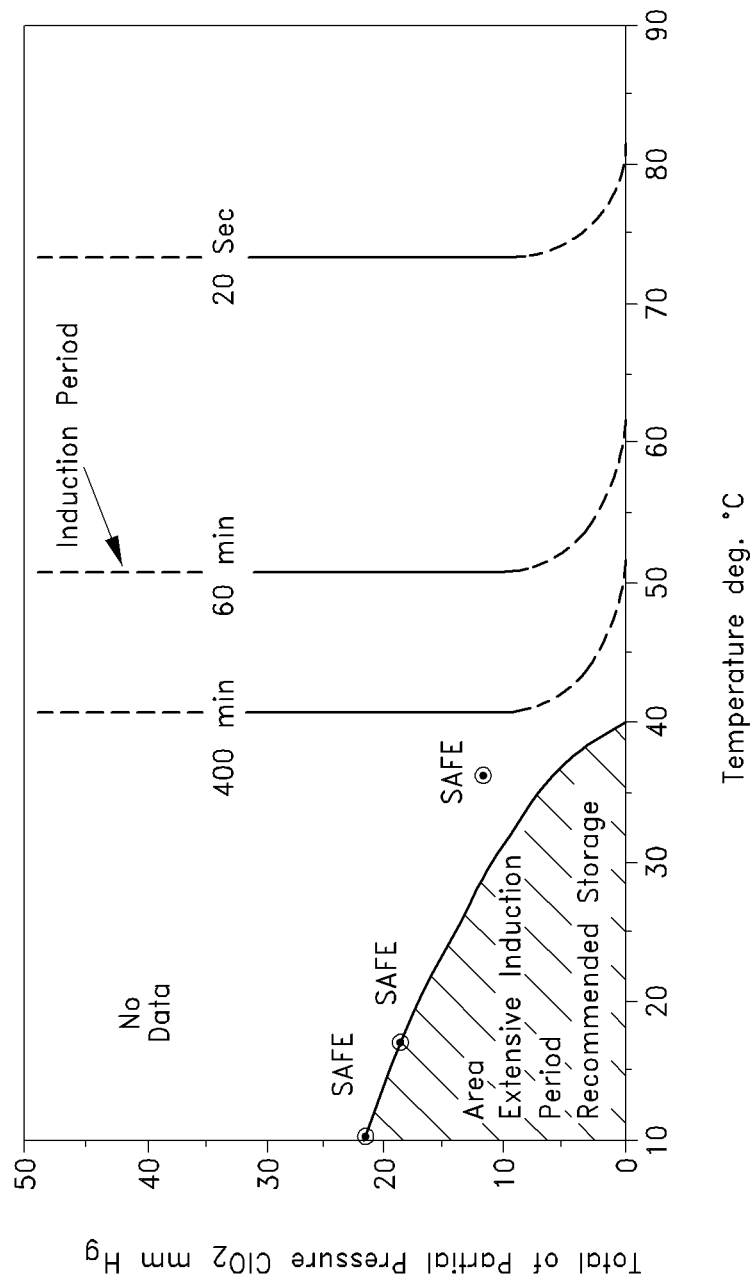
FIG. 2 shows a contemplated induction time, the time required for decomposition of chlorine dioxide as a function of time and partial pressure.

Regarding FIG. 2: a) the hashed area is a recommended environment for gas storage—an environment with minimal decomposition, if it is necessary to store the gas (for short or longer terms); b) the transport between chlorine dioxide generator and reaction vessel is deliberately short and never obstructed, therefore requiring just seconds at most; c) as noted above, the contemplated NOx reaction only requires 1.5 seconds so from an induction time perspective the reaction chamber temperature could be elevated as long as the total partial pressure remained low; and d) as a reference point a 10% chlorine dioxide concentration in gas phase described in FIG. 1 corresponds to a partial pressure of 76 mm of Hg in FIG. 2—a value that is outside the safe working environment described in this chart. However, 5% chlorine dioxide in gas phase described in FIG. 1 is well within the safe environment described on FIG. 2.

Figure 3:
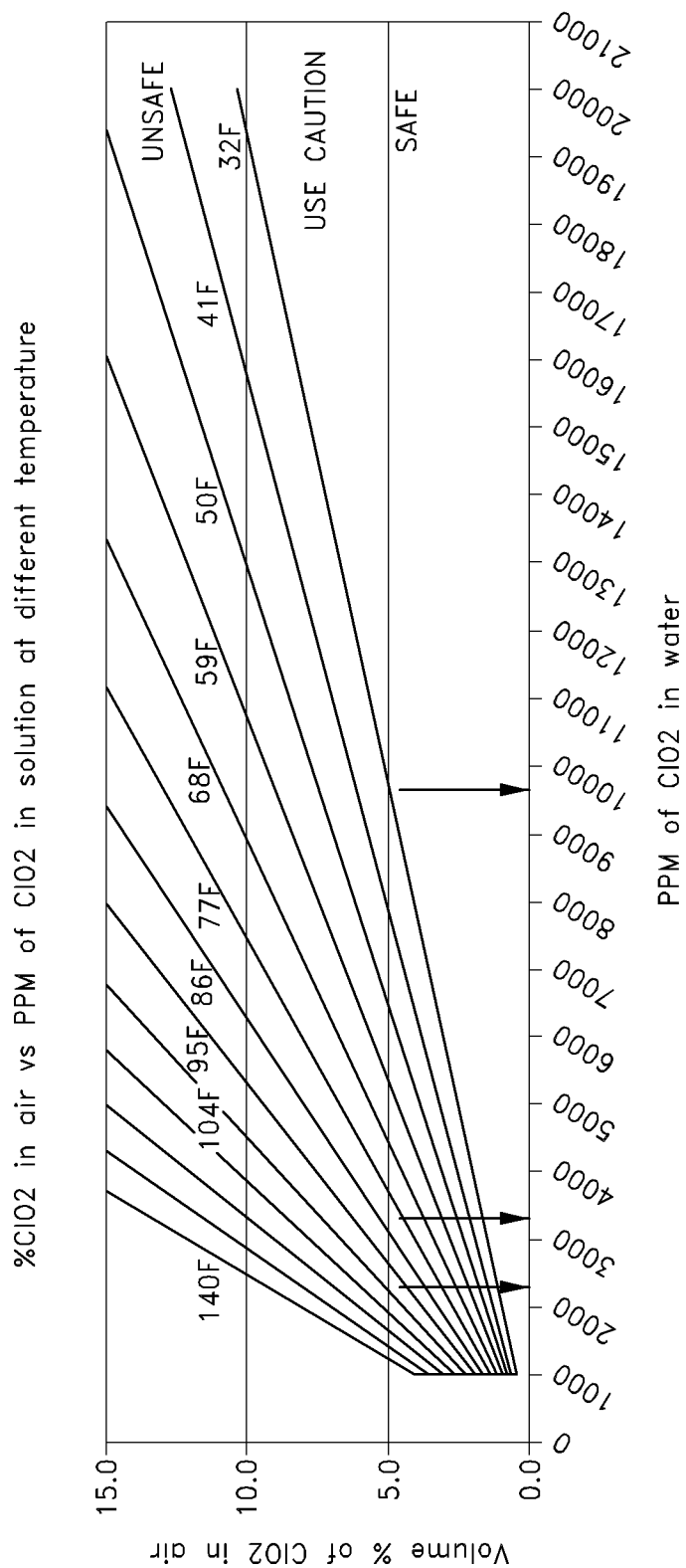
FIG. 3 shows a plot of chlorine dioxide vapor pressure as % in air at various temperatures.

FIG. 3 shows that gas phase chlorine dioxide is theoretically safe at up to 9.5% (95,000 ppm(g)) when used in environments that effectively address all variables that affect decomposition. The safe concentration for chlorine gas dissolved in water varies dramatically with temperature. By way of examples, which are referenced by the arrows in the above graph, some pulp and paper operations safely store thousands of gallons of chlorine dioxide dissolved in water near 9000 ppm concentrations as long as it is maintained at near freezing temperatures, chlorine dioxide is considered safe for transportation and general storage at concentrations of 3000 ppm. This generalization is true as long as the liquid is stored at or below 86° F.; and at 104° F. chlorine dioxide in water is safe at concentrations near 2200 ppm. In addition, there are other variables like sunlight and vibration that influence chlorine dioxide decomposition which need to be considered in process design and chemical storage decisions.

As mentioned earlier, some embodiments allow for the $ClO_2$ gas to be dissolved in an aqueous solution with pH above 9. In these embodiments, the basic solution increases the scrubbing removal efficiency by providing enhanced solubility for NOx. The basic solution, however, might be disadvantageous in embodiments where HCl and $HNO_3$ acids in the condensate are being captured for commercial value.

In some embodiments, the rate of $ClO_2$ addition is based on the concentration of NOx in the waste gas. In applications where the NOx concentration is not consistent in the waste gas, then the addition of automated chemical feed controls may be utilized to optimize both removal efficiency and scrubber operating costs. An example of contemplated automated chemical feed controls is shown in Example 3. Contemplated automated feed controls are designed to sense the NOx concentration in the treated waste gas and the liquid condensate pH then adjust the amount of chlorine dioxide and basic liquid (if used) that are sprayed into the waste gas.

A second mist or packed bed scrubbing stage is optional, and in some embodiments, may improve the decontaminated gas quality while enhancing the capture of HCl and $HNO_3$.

As mentioned earlier, the design of the reaction vessels is an important consideration in order to avoid the formation of submicron HCl droplets. Mist eliminators can aid in the removal of this condition if droplets are allowed to form.

NOx-containing gas (waste gas, gas or waste air) may be streamed through the reaction vessel using a blower to move the air through the vessel. This blower can be placed before or after the vessel (upstream, midstream, or downstream of the vessel). In some embodiments, the blower is placed downstream (after), because that placement keeps the ducting and vessel at slightly negative pressure when compared to the atmosphere, thereby eliminating the release of untreated air in the event of a leak. The downstream orientation can be advantageous for another reason—it reduces the pressure in the reaction system slightly below ambient. The lower working pressure enhances the safe working environment for $ClO_2$. A variable frequency drive enhances operational flexibility by allowing the air flow to be reduced during off hours while still maintaining a minimal number of air changes in tire process areas that create the waste gas.

EXAMPLES

Example 1 Exemplary Process and Apparatus

A process for NOx scrubbing, as disclosed herein, is demonstrated in this Example by using a single stage pilot scale mist scrubber. The pilot scrubber processed a slip stream of waste gas at approximately 22° C. from a chemical milling operation. The NOx concentration in the waste gas stream varied between 10 and 100 ppm during the series of tests completed to prove up this new process methodology; however, it are preferably understood that significant concentrations of NOx can be treated in a waste gas stream, including concentrations of about 20000 ppm or more. The $NO/NO_2$ ratios in the NOx varied slightly however the NO concentration was consistently above 90%.

Figure 4:
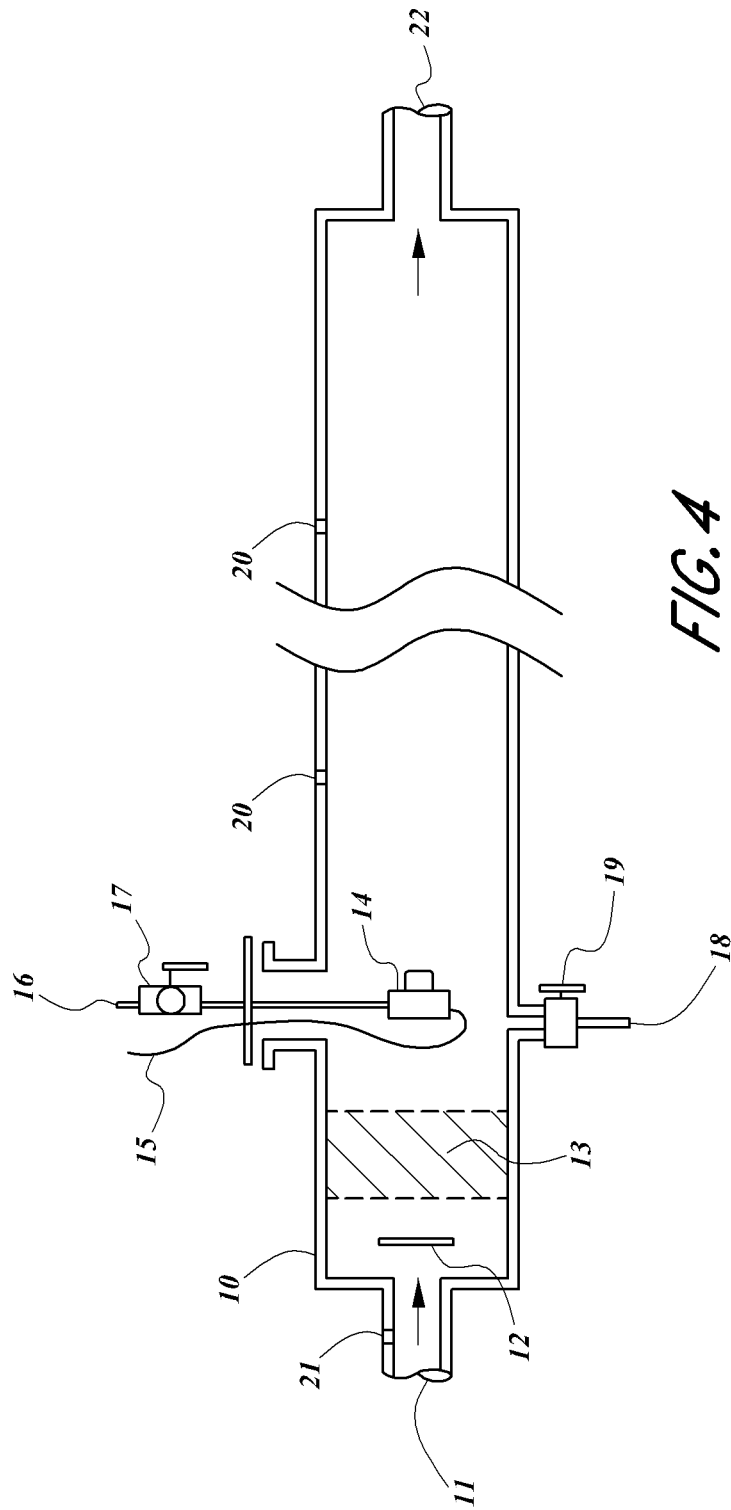
FIG. 4 shows a contemplated embodiment of an apparatus.

FIG. 4 shows a section cut through a contemplated embodiment—the single stage pilot scrubber—used in the performance testing. A scrubber vessel 10 is PVC pipe mounted horizontally during testing. The vessel 10 in any other configuration and orientation that can provide an enclosure for mist is applicable and included in this description. Waste gas enters the vessel 10 through a PVC pipe 11. A PVC baffle plate 12 disturbs the gas flow linearity in the vessel 10 prior to a gas swirling device 13. An air atomized nozzle (nozzle) 14 was used in tests to introduce gas and/or liquid to the waste gas stream in the vessel 10. In some tests the nozzle 14 was used to introduce liquids through a tube 15 in other test only gas was introduced to the nozzle through a tube 16. The pressure and flow rate of gas fed to the nozzle 14 were adjusted at a regulator 17. A hole 20 was used to extract treated gas samples from the vessel 10. The hole 20 was repeated in the vessel 10 at intervals away from the nozzle 14 so that samples with progressively longer residence time in the vessel 10 could be obtained and analyzed to determine the rate of NOx destruction in the gas within the vessel 10. The rate of NOx destruction in the vessel 10 was determined by comparing the treated gas samples from the various hole 20 locations against untreated waste gas samples takes at a hole 21. Gas was moved through the vessel 10 by ducting 22 connected to the suction side of a variable flow rate blower.

Contemplated processes, as outlined earlier, utilize two methods in which chlorine dioxide gas effectively converts gas containing both NO and $NO_2$ into HCl and $HNO_3$ in a single stage mist type gas scrubbing apparatus. The first method: reactions between gas containing NOx and chlorine dioxide gas dissolved in a basic solution (preferably above pH 9). The second method: reactions between waste gas with high relative humidity containing NOx and chlorine dioxide gas. Both reactions could occur according to the paths described in equation 32 and 33 below. Both of these methods using single stage mist scrubbing apparatus are a major departure from the multi-stage wet scrubbing apparatus reported in prior art.

$$5NO+2ClO_2+H_2O \rightarrow 3NO_2+2HCl \tag{32}$$

$$5NO_2+ClO_2+3H_2 \rightarrow 5HNO_3+HCl \tag{33}$$

The overall rate of reaction for both equations 32 and 33 with greater than 99 removal efficiency is less than 1.5 seconds of residence time when the humid gas containing NOx and $ClO_2$ gas are well mixed.

An optional second stage mist or wet scrubbing apparatus can provide several functions. First it can remove of excess chlorine dioxide in apparatus that does not include automated controls to effectively regulate chlorine dioxide gas addition. Second, it can capture HCl and $HNO_3$ acid fumes in apparatus that introduces $ClO_2$ as a gas that is not dissolved in a basic solution.

The reactions described in equations 32 and 33 above occur more rapidly in the mist and gas phase scrubbing technology than the wet scrubbing reactions described in equations 30 and 31 in the background section. The increased speed of reaction reduces the reaction vessel size required for conversion of NOx to acids. Furthermore, the air or mist scrubbing methodology is less complicated and requires less maintenance than packed bed or tray type wet scrubbers. As a result the air or mist technology equipment is less expensive to purchase and operate.

Gas analysis for NO and NOx was done during the pilot testing with electrochemical sensors for NO and NOx. These sensors were evaluated for cross sensitivity by other compounds known to be in the gas stream or suspected of being present in the gas stream and also factory calibrated before and after testing. The electrochemical analysis was further cross checked with EPA Method 07 for NOx.

Example 2: Form of Chlorine Dioxide Gas Introduction

Chlorine dioxide gas can be introduced to NOx and/or SOx in at least three ways: as a gas, as a mist and as a liquid. These three methods use the same stoichiometry, because it is the $ClO_2$ gas that is reacting with the NOx as opposed to an ionic form of chlorine dioxide in all three reactive environments, which is a major distinction between this process and others that have utilized the ionic variation of this molecule for wet scrubbing in the past.

The gas and mist phase systems have different mechanical configurations. In addition to different nozzle types, which is described in each section below, the sequence of mixing, along with $ClO_2$ addition, may be different. Research has shown that mixing after gas injection works better than the opposite in some embodiments, so in the gas phase this is the sequence used, however, in other embodiments other configurations can be employed. The issue of droplet aggregation may supersede this advantage in the mist systems. The mixing tends to cause agglomeration. Therefore where mist is used the mixing is usually introduced prior to $ClO_2$ addition.

This contemplated application is ideal for operations with modest waste gas flow rates and modest NOx and/or SOx concentrations. The boundaries are flexible, but can be cost effective for waste gas flow rates of about 10,000 CFM or less and NOx concentrations of about 1000 or less. Higher concentrations of NOx and/or SOx can be treated, e.g., by increasing the concentration of $ClO_2$, or by diluting the concentration of NOx and/or SOx.

This process can be cost effective for smaller applications, because there is no need for the cost of onsite $ClO_2$ generation. $ClO_2$ gas can be supplied that has been suspended in water that is buffered to minimize off-gassing.

The $ClO_2$ can be introduced before, during and/or after the waste gas is swirled. Research has shown that air atomized nozzles are particularly well-suited for this application. These produce fine mist droplets out of $ClO_2$ gas suspended in an aqueous phase. The goal is to maximize the ratio of droplet surface area to liquid volume, which is achieved when the droplets are in the micron or sub-micron range. Although smaller is typically better, a desirable balance between performance and cost can be found when the mean diameter is about 100 microns.

This is generally commercially available up to about 3,000 ppm $ClO_2$. Higher concentrations are possible at lower temperatures, but the need for refrigeration introduces a safety concern in the event the refrigeration system fails. If appropriate systems are developed to address these safety concerns, then concentrations can be increased accordingly. This process generally requires about 1.5 seconds of residence time for 99% removal. Higher removal efficiency is possible with longer residence time.

Chlorine dioxide, in the gas phase, is introduced into the waste gas before it is mixed. This application works for various sizes of NOx and/or SOx loading situations, but good cost effectiveness in applications where the waste gas stream is in excess of about 10,000 CFM with NOx loading of about 50 ppm or more. If cost concerns are alleviated, NOx loading can be effectively increased. Contemplated processes can be applicable to NOx (and/or SOx) loading as high as 50,000 ppm or more.

An amount of chlorine dioxide for reaction with SOx is similar to an amount required to react with an equivalent amount of NOx (on a molar basis). In other words, the same amount of $ClO_2$ may be suitable to treat 2 equivalents of NOx or 1 equivalent of NOx and 1 equivalent of SOx. The amount of chlorine dioxide added to the waste gas can be adjusted depending upon the composition of the waste gas. Sensors can be provided that detect the amount of SOx and/or NOx in the untreated waste gas and this information employed to determine an amount of chlorine dioxide to be added to the untreated waste gas. However, it may be advantageous to measure SOx and/or NOx in the treated waste gas. This information can then be used to adjust, e.g., continuously or intermittently, the amount of chlorine dioxide introduced into the untreated waste gas so as to achieve a target SOx and/or NOx concentration in the treated waste gas. This latter configuration can offer advantages in that high SOx and/or NOx concentrations as in untreated waste gas can cause premature sensor failure. The lower SOx and/or NOx concentrations in the treated waste gas can substantially increase sensor life, permitting longer uninterrupted operation of the reactor.

Contemplated processes using the gas phase can employ the generation of gas phase $ClO_2$ on site, which is preferably done using electrochemical methodology. Contemplated chemical methods of generating $ClO_2$ produce $ClO_2$ suspended in a liquid that has high pH and impurities. These chemical processes also generate waste acid that can be treated. The high pH (NaOH) and other waste products from electrochemical processes can be used in a second stage acid fume scrubber so there is no waste to treat or to dispose, thereby offering a significant environmental advantage.

This gas phase process is typically at least 10 times faster than the mist process, as described above, such that shorter residence times can be employed. Current research includes treating NOx in waste gas streams moving at 2500 feet per minute with 99% removal efficiency in less than about 5 feet of duct length (after the mixing section). This considerably fast gas phase reaction dramatically reduces the size of the reaction vessel or eliminates it completely.

Example 3: Contemplated Automated Chemical Feed Controls

Contemplated controllers are designed to handle the entire air scrubbing process for a 32,000 CFM NOx scrubber system and similar systems. Contemplated devices monitor and regulate the following components. First Stage NOx scrubber (using $ClO_2$); Second stage acid scrubber (using NaOH and other effluent from the $ClO_2$ generator; Manage a $ClO_2$ generator, Fans; Storage and packaging system for $ClO_2$ gas suspended in water (hereinafter identified as liquid $ClO_2$.); Communication both local and remote.

Contemplated control systems also manage the attached equipment in two modes of operation: designed to insure the attached equipment can reliably and effectively remove NOx from a waste gas stream in a way that safely optimizes the efficiency of the reaction between $NaClO_2$ and electricity to form $ClO_2$ and optimizes the reaction between $ClO_2$ and NOx in the first scrubbing stage. Furthermore this system can insure gas leaving the second scrubbing stage is free of excess $ClO_2$ and mineral acid fumes, and at times when there is no need for gas phase $ClO_2$, then the $ClO_2$ generator has the ability to produce liquid $ClO_2$ in a safe and reliable way.

This system is an integral part of maintain an effective system. If this air treatment system is down, production stops because without it, the system is out of compliance with regulatory constraints. Because this system is critical to production, the control system includes sensors and control logic that allows evaluation of the equipment and reporting of conditions that can lead to shutdowns before they occur. This allows the operators to take action and avoid a shutdown in most if not all situations.

Therefore, this system design includes a detailed evaluation of the PLC logic for a $ClO_2$ generator to insure this device can reliably and safely deliver $ClO_2$ in the two previously mentioned phases.

Example 4: Generalized Process Control Parameters

1. There can be password control on the program. This applies both to access at the HMI and remote access.
   a. Operator Level can have the ability to change process set-points pertaining to NOx removal efficiency from the first stage and second stage. The minimum and maximum pH settings for the second stage.
   b. Technician Level can have the ability to change PLD loop tuning variables, intervals for data averaging and other similar variables plus those variables controlled on the Operator Level.
   c. Programming Level can have the ability to update program code and everything else.
2. The program indicates three levels of alarm and this information can be available both at the HMI and remotely.
   a. Warning: This includes non-critical range low or high levels for process equipment. For example low or high tank levels, low or high pressures, temperatures or process efficiency.
   b. Problem: This includes all critical levels for temperature, pressure, tank level and process efficiency.
   c. Shutdown: A critical variable has exceeded its setpoint and the automatic equipment shutdown sequence has occurred.

The warning level alarm conditions can be disabled at a Technical level password protected screen.
3. The program can have automatic startup and shutdown sequences for both the liquid and gas phase $ClO_2$ operations. These shutdowns are triggered either by the process shutdown alarm or by pressing the emergency stop button. The restart after automated or emergency shutdown requires the operator to remedy any alarm conditions prior to proceeding. This restart can have the option of using either the previous process variable set points or the default set points. The HMI shows what variable has triggered the alarm and recommend in order of likelihood, one or more suggested operator activates to remedy the alarm In addition to display on the HMI, this information can be conveyed by email to selected individuals who require or need notification.
4. The program supports data logged in a discrete way (controlled behind a technical level password protected screen.) The data logging preferably has the ability to be remotely downloaded in a safe way. If encryption is easily available, that would be a plus
5. The controller sends a 4-20 mA signal to the $ClO_2$ generator that is used to regulate the rate of $ClO_2$ production by the generator. The value of this signal (AO-1) can be determined by comparing the analog inputs from two separate sensors: NOx and $ClO_2$. Both sensors measure their respective process variables from exhaust gas at a point after the second stage scrubber. Both of the sensors convey analytical data that represents the concentrations of their measured gas via loop powered 4-20 mA signals. The controller provides 24V DC power to each gas transmitter and the transmitter superimposes a 4-20 mA signal on this loop.
6. The analog output AO-1 from the controller utilizes "if then" logic that is based on the following parameters.
   a. Analog data from the NOx (AI-1) and $ClO_2$ (AI-2) sensor are independently averaged. The averaging period duration is changed on a screen that is protected by the Technical Level password.
   b. There can be a set point for maximum $ClO_2$ in the waste gas stream. This set point can be changed at the Technical Level.
   c. There can be a set point for the maximum NOx in the exhaust gas. This can be changed at the Operator Level.
   d. If there are no alarms (system is operating properly) and both sensors are at no-detect then the first stage scrubbing system is optimally tuned
   e. If the NOx sensor is at no-detect and the $ClO_2$ is detecting then turn down the $ClO_2$ generation until the reported averaged sensor value is less than the set point for average NOx in the waste gas stream.
   f. If the NOx sensor is reading above the average NOx set point then increase the $ClO_2$ generator output until the NOx level is below the average NOx set point
   g. If both the $ClO_2$ and NOx are above their average set points then the $ClO_2$ generation is rapidly increased (accelerated PID ramp up rate) and a warning alarm is triggered. This alarm automatically resets when the condition is resolved.

7. The controller sends a 4-20 mA signal (AO-2) to the DP $ClO_2$ generator tank identified as 5-53-TK. (NaOH) metering pump. The pH sensors convey their measured variable via loop powered 4-20 mA signals. Ille controller provides 24V DC power to the pH transmitter and the transmitter superimposes a 4-20 mA signal on this loop.
   a. This metering pump can be connected to the discharge point in the waste tank 5-53-TK.
   b. It is recommended that the tank's 5-55-TK size to be increased to 300 gallons or larger.
   c. Waste RO water should go directly to a drain rather than be included with the catholyte and analyte waste streams.
   d. See #9-11 below for more information pertaining to tank 5-55-TK 8. The controller sends a 4-20 mA signal (AO-3) to the sodium hydroxide (NaOH) metering pump. The pH sensors convey their measured variable via loop powered 4-20 mA signals. The controller provides 24V DC power to the pH transmitter and the transmitter superimposes a 4-20 mA signal on this loop.
   a. This metering pump can be connected to a source of 50% sodium hydroxide solution.

9. The pH set point of the second stage scrubber sump can be maintained by utilizing a combination of both sodium hydroxide sources
   a. The generator tank 5-53-TK can be used first.
   b. If this pump is operating at full capacity and the pH set point is still not met then the second chemical metering pump connected to the 50% NaOH can be progressively increased until the set point is reached 10. Three digital sensors are preferably installed on the $ClO_2$ generator cell waste liquid tank (5-53-TK) a low, a medium-high and high-high.
    a. The PLC utilizes the low and the medium high to regulate waste transfer pump 5-55-PU. This liquid is preferably transferred to another location.
    b. The PLC utilizes the high-high as part of the "problem" level alarm condition logic.

11. A second discharge port is preferably installed from tank 5-53-TK. This can be made available to a chemical metering pump supplied as part of the equipment. This fitting can have a manual shut off valve and VP NPT fitting.

12. There can be a digital level sensor on the external liquid $ClO_2$ tank. When this level is reached the $ClO_2$ generator is shut off and shutdown alarm is triggered. This tank is not used initially so the contact can be bypasses.

13. Ideally the generator preferably has the ability to control concentration of $ClO_2$ being delivered in gas phase by two methods:
    a. Changing the power to the cells.
    b. Changing the rate of gas flowing through the cell or diverting a percentage of the $ClO_2$ laden gas into a bubbler that stores it in water. The second activity improves the speed of process control and minimize over or under feeding $ClO_2$ into the first stage scrubber.

14. The generator sends the following digital signals to the controller. All signals can be 24 volt DC and loop powered from the control panel:
    a. The generator is on and operating in the gas phase $ClO_2$ methodology (DI-1)
    b. The generator is on and operating in the liquid phase $ClO_2$ methodology (DI-2)
    c. There is a Warning level alarm. Alarms that are in this category can be defined (DI-3).
    d. There is a Problem level alarm. Alarms that are in this category can be defined (DI-4).
    e. The generator is shutting down due to a shutdown level alarm condition (DI-5)
    f. The generator is shutting down due to manual command. (DI-6).
    g. Once the available analog and digital data generated in the Generator/PLC then some of these may be sent to the controller as inputs.

15. Each process variable can be graphically displayed next to a comparable bar chart that shows the set point for that variable.

Example 6: Process Details for First Stage (NOx Scrubber) and $ClO_2$ Generator

Waste gas with varying concentrations of NO and $NO_2$ at temperatures between 70 and 90 Fahrenheit and 30 to 80 percent relative humidity is effectively mixed with $ClO_2$ gas in concentrations necessary to convert an operator determined percent of the NOx in the waste gas into mineral acids. Typically the removal efficiency is near 99.5 percent.

The $ClO_2$ gas injection rate into the waste gas varies according to if then logic described above.

A loop powered analog pressure sensor in the $ClO_2$ gas duct (AI-5). Two levels of alarm are provided. The lower level can be a problem and the higher triggers a generator shut down (DO-1). The pressure set points can be adjusted with Technical Level access.

Waste gas from the first stage with acid fumes and low or no concentrations of NOx is treated in the existing counter current packed bed scrubber. The goal is to keep the pH as low as possible and still meet the NOx treatment set point. The pH is controlled by the addition of waste streams liquid from the generator and the addition of 50% sodium hydroxide liquid. All liquids can be introduced directly into the scrubber sump as described in #7-9 above.

Cleaning follows a policy of draining and re-filling the scrubber sump twice per week and manually maintaining the scrubber liquid level between water changes. Provide normally closed input (DI-8) in the event a sump water level sensor is included for sump water level.

The recirculation pumps for the second stage scrubber are necessary in this embodiment. The transmitters are manual at this time and are expected to remain manual so there is no need to include inputs from automated alarms.

There are two fans associated with this contemplated scrubber. One is on/off and the other is controlled with a variable frequency drive. It is essential that air is moving through the ducting while $ClO_2$ is being introduced to the waste gas. Therefore a gas flow sensors is required.

A normally closed gas flow sensor (DI-10) can be installed in the waste gas stream after the second stage. If this does not indicate gas flow when at least one fan is on then a Shutdown level alarm is immediately triggered. There can be a 10 second delay after fan start before this alarm condition becomes active.

Example 7: I/O Table for PRDD Controller

Analog

| | |
|---|---|
| AI-1 | NOx #1 gas concentration in post second stage waste gas. |
| AI-2 | $ClO_2$ gas concentration in post second stage waste gas. |
| AI-3 | The pH in the second stage scrubber sump. |
| AI-4 | |
| AI-5 | |
| AO-1 | $ClO_2$ Production rate control for DP generator associated with first scrubbing stage |
| AO-2 | NaOH addition from DP tank 5-53-TK to second scrubbing stage sump. |
| AO-3 | NaOH addition from 50% NaOH tote to second scrubbing stage sump. |

Digital

| | |
|---|---|
| DI-1 | The DP generator is on and operating in the gas phase $ClO_2$ mode. |
| DI-2 | The DP generator is on and operating in the liquid phase $ClO_2$ mode. |
| DI-3 | Warning level alarm from the DP generator |
| DI-4 | Problem level alarm from the DP generator |
| DI-5 | Automatic shutdown of the DP generator due to a shutdown alarm condition. |
| DI-6 | Manual shut down of the DP generator. |
| DI-7 | Low second stage sump water level. |
| DI-8 | High differential pressure in second stage mist eliminator |
| DI-9 | High differential pressure in the second stage scrubber |
| DI-10 | Low waste air flow in scrubbing duct system |
| DI-11 | High liquid $ClO_2$ tank sensor |
| DO-1 | Shutdown command to the DP generator |

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It are preferably noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, are preferably construed as open ended as opposed to limiting. As examples of the foregoing, the term 'including' are preferably read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' are preferably interpreted as 'having at least;' the term 'includes' are preferably interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead are preferably read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather are preferably read as 'and/or' unless expressly stated otherwise. Similarly, a group of items linked with the conjunction 'or' should not be read as requiring mutual exclusivity among that group, but rather are preferably read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It is further understood by those within the art that if a specific number of an introduced claim recitation is intended, such an intent is explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It is further understood by those within the art that virtually any disjunctive word and/or phrase presenting two or more alternative terms, whether in the description, claims, or drawings, are preferably understood to contemplate the possibilities of including one of the terms, either of the terms, or both terms. For example, the phrase "A or B" is understood to include the possibilities of "A" or "B" or "A and B."

All numbers expressing quantities of ingredients, reaction conditions, and so forth used in the specification are to be understood as being modified in all instances by the term 'about' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter are preferably construed in light of the number of significant digits and ordinary rounding approaches.

Furthermore, although the foregoing has been described in some detail by way of illustrations and examples for purposes of clarity and understanding, it is apparent to those skilled in the an that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A system for treating a waste gas of at least one of nitrogen oxides and sulfur oxides, comprising:
   an apparatus comprising an inlet for receiving a volume of a waste gas, and an inlet for receiving a volume of chlorine dioxide;
   wherein the waste gas and chlorine dioxide combine to form a mixture within the apparatus, and wherein the mixture comprises one or more reaction products formed from the combination of chlorine dioxide and the waste gas;
   the apparatus comprising a turbulence inducing device disposed therein configured to induce turbulence to at least one of waste gas, the chlorine dioxide, and the mixture.

2. The system as recited in claim 1 wherein the waste gas contains at least one component selected from the group consisting of sulfur oxides and nitrogen oxides.

3. The system as recited in claim 1 wherein the reaction product is a component of the waste gas that has been converted to a different chemical form for removal from the apparatus.

4. The system as recited in claim 1 wherein the volume of the waste gas and the volume of the chlorine dioxide are provided in the form of streams that flow within the apparatus.

5. The system as recited in claim 1 wherein the volume of chlorine dioxide is in a gaseous form.

6. The system as recited in claim 1 wherein the turbulence inducing device is positioned within the apparatus downstream from one or both of the waste gas inlet and the chlorine dioxide inlet.

7. A device for chemically converting at least one component of a gas comprising one of nitrogen oxides and sulfur oxides, the device comprising an internal chamber that is configured to receive a volume of the gas and a volume of chlorine dioxide in a manner causing the volume of gas and chlorine dioxide to combine and form a mixture, wherein the mixture comprises a reaction product that is chemically different from at least one component of the gas, and wherein a turbulence inducing component is disposed within the device.

8. The device as recited in claim 7 comprising an outlet for removing the reaction product therefrom.

9. The device as recited in claim 7 wherein the turbulence inducing component is placed downstream of where one or more of the gas and the chlorine dioxide enters the chamber.

10. The device as recited in claim 9 wherein the turbulence inducing component is configured to ensure mixing together of the gas and the chlorine dioxide.

11. The device as recited in claim 7 wherein the chlorine dioxide is introduced into the chamber in a gaseous form.

12. The device as recited in claim 7 comprising an outlet for removing the reaction product.

13. The device as recited in claim 7 wherein the chlorine dioxide is introduced into the chamber in the form of a mist downstream from where the gas enters the chamber.

14. A method for chemically converting a component of a gas comprising the steps of:
   introducing a volume of gas into an apparatus;
   introducing a volume of chlorine dioxide in the apparatus; and
   causing the gas and chlorine dioxide to combine within the apparatus to form a mixture, wherein the mixture comprises a reaction product that is chemically different from a component of the gas;
   wherein while the gas and chlorine dioxide are disposed within the apparatus one or both are subjected to turbulent flow conditions through the use of a turbulence inducing component.

15. The method as recited in claim 14 wherein the gas comprises at least one component selected from the group consisting of sulfur oxides, nitrogen oxides and combinations thereof.

16. The method as recited in claim 14 wherein the gas and the chlorine dioxide are each introduced into the apparatus in the form of a stream.

17. The method as recited in claim 14 wherein the chlorine dioxide is introduced in the form of a gas and combines with the gas to form a gaseous mixture that passes through the apparatus.

18. The method as recited in claim 14 comprising removing the reaction product from the apparatus.

* * * * *